(12) United States Patent
Teppler

(10) Patent No.: US 6,895,507 B1
(45) Date of Patent: May 17, 2005

(54) METHOD AND SYSTEM FOR DETERMINING AND MAINTAINING TRUST IN DIGITAL DATA FILES WITH CERTIFIABLE TIME

(75) Inventor: Steven W. Teppler, Sarasota, FL (US)

(73) Assignee: Time Certain, LLC, Kensington, MD (US)

( * ) Notice: Subject to any disclaimer, the term of this patent is extended or adjusted under 35 U.S.C. 154(b) by 781 days.

(21) Appl. No.: 09/609,646

(22) Filed: Jul. 3, 2000

Related U.S. Application Data

(60) Provisional application No. 60/142,132, filed on Jul. 2, 1999.

(51) Int. Cl.[7] .............................. H04L 9/00; H04K 1/00
(52) U.S. Cl. ..................... 713/200; 713/155; 713/156; 713/178; 713/186
(58) Field of Search .................................. 713/200, 178

(56) References Cited

U.S. PATENT DOCUMENTS

| | | | | |
|---|---|---|---|---|
| 5,001,752 A | * | 3/1991 | Fischer ....................... | 713/178 |
| 5,022,080 A | * | 6/1991 | Durst et al. .................. | 713/178 |
| 5,136,643 A | | 8/1992 | Fischer | |
| 5,136,646 A | | 8/1992 | Haber et al. | |
| 5,136,647 A | * | 8/1992 | Haber et al. ................ | 713/178 |
| 5,189,700 A | * | 2/1993 | Blandford ................... | 713/178 |
| RE34,594 E | | 4/1994 | Christians | |
| 5,373,561 A | | 12/1994 | Haber et al. | |
| RE34,954 E | * | 5/1995 | Haber et al. ................... | 380/30 |
| 5,422,953 A | * | 6/1995 | Fischer ....................... | 713/172 |
| 5,500,897 A | * | 3/1996 | Hartman, Jr. ............... | 713/178 |
| 5,619,571 A | | 4/1997 | Sandstrom et al. | |
| 5,748,738 A | | 5/1998 | Bisbee et al. | |
| 5,781,629 A | | 7/1998 | Haber et al. | |
| 5,781,630 A | * | 7/1998 | Huber et al. ................ | 713/178 |
| 5,903,882 A | | 5/1999 | Asay et al. | |
| 5,910,988 A | * | 6/1999 | Ballard ....................... | 705/75 |
| 5,923,763 A | * | 7/1999 | Walker et al. ................ | 380/51 |
| 5,970,146 A | * | 10/1999 | McCall et al. .............. | 713/194 |

(Continued)

FOREIGN PATENT DOCUMENTS

| | | | | |
|---|---|---|---|---|
| GB | 2323455 A | 9/1998 | ............ | G04G/1/00 |

OTHER PUBLICATIONS

D. Mills, "Simple Network Time Protocol (SNTP) Version 4 for IPva, IPv6, and OSI", Oct. 1996.
Office Action for Application 09/421,279, Sep. 15, 2003.
Final Office Action for Application 09/421,279, Jan. 29, 2004.
Office Action for Application 09/429,360, Jan. 15, 2004.

*Primary Examiner*—Thomas R. Peeso
*Assistant Examiner*—Kambiz Zand
(74) *Attorney, Agent, or Firm*—Venable LLP; James R. Burdett; W. Russell Swindell

(57) ABSTRACT

A system and methods for proving dates of digital data files, which are accessed, created, modified, received, or transmitted by a computer includes a trusted time source in a tamperproof environment, a first subsystem for saving the file at a moment in time, a second subsystem for retrieving from the trusted time source a date and a time corresponding to the moment in time, a third subsystem for appending the date and the time retrieved from the trusted time source to the saved file, a fourth subsystem for signing the saved file with the date and the time retrieved from the trusted time source appended thereto, a fifth subsystem for hashing the signed file to produce a digest, a sixth subsystem for signing the digest with a key to produce a certificate, a seventh subsystem for appending the certificate to the saved file, and an eighth subsystem for saving the file with the certificate appended thereto. The trusted time source is a real time clock, which is not resettable, is independent of any system clock of the computer, and is installed locally relative to the computer.

16 Claims, 10 Drawing Sheets

U.S. PATENT DOCUMENTS

| | | |
|---|---|---|
| 6,047,282 A | 4/2000 | Wilson et al. |
| 6,081,899 A * | 6/2000 | Byrd .......................... 713/201 |
| 6,209,090 B1 * | 3/2001 | Aisenberg et al. .......... 713/178 |
| 6,209,091 B1 | 3/2001 | Sudia et al. |
| 6,226,744 B1 | 5/2001 | Murphy et al. |
| 6,237,096 B1 | 5/2001 | Bisbee et al. |
| 6,253,331 B1 * | 6/2001 | Kotani ....................... 713/400 |
| 6,263,438 B1 * | 7/2001 | Walker et al. .............. 713/178 |
| 6,356,937 B1 | 3/2002 | Montville et al. |
| 6,393,126 B1 * | 5/2002 | van der Kaay et al. ..... 380/241 |
| 6,393,566 B1 * | 5/2002 | Levine ........................ 713/178 |
| 6,408,388 B1 * | 6/2002 | Fischer ........................ 713/176 |
| 6,442,691 B1 | 8/2002 | Blandford |
| 6,449,255 B1 | 9/2002 | Waclawsky |
| 6,490,355 B1 * | 12/2002 | Epstein ........................ 380/203 |
| 6,530,023 B1 * | 3/2003 | Nissl et al. .................. 713/200 |
| 6,601,172 B1 * | 7/2003 | Epstein ........................ 713/178 |
| 2001/0011350 A1 * | 8/2001 | Zabetian ...................... 713/176 |

* cited by examiner

METHOD AND SYSTEM FOR DETERMINING AND MAINTAINING TRUST IN DIGITAL DATA FILES WITH CERTIFIABLE TIME

CROSS-REFERENCE TO RELATED APPLICATIONS

This application claims the benefit of U.S. Provisional Application No. 60/142,132, filed on Jul. 2, 1999, the contents of which are incorporated herein by reference. This application is related to the following co-pending, commonly assigned applications, each of which is incorporated by reference: U.S. patent application Ser. No. 09/421,279, entitled "SMART CARD SYSTEM AND METHODS FOR PROVING DATES IN DIGITAL DATA FILES," filed Oct. 20, 1999; U.S. patent application Ser. No. 09/429,360, entitled "PERSONAL COMPUTER SYSTEM AND METHODS FOR PROVING DATES IN DIGITAL DATA FILES," filed Oct. 28, 1999; and U.S. patent application Ser. No. 09/609,645, entitled "SYSTEM AND METHODS FOR PROVING DATES IN DIGITAL IMAGING FILES," filed Jul. 3, 2000.

COPYRIGHT NOTICE

Portions of the disclosure of this patent document may contain material that is subject to copyright protection. The copyright owner has no objection to the facsimile reproduction by anyone of the patent document or the patent disclosure, as it appears in the patent and Trademark Office patent file or records, but otherwise reserves all copyright rights whatsoever.

BACKGROUND OF THE INVENTION

1. Field of the Invention

The present invention relates generally to digital data files, and more particularly to systems and methods for proving dates in such digital data files.

2. Statement of the Prior Art

Scope of the Problem

Digital data files come in many formats. None of those formats currently provide means for proving—with certainty—dates and times associated with access, creation, modification, receipt, saving, or transmission of such digital data files. This is not only due to the variety of application programs which are available for digital data file access, creation, modification, receipt, saving, and transmission, but also due to the much more varied "standards" and protocols put forth in the vain attempt to provide uniformity worldwide.

Illustrative of the enormity of the problem are the following operating environments, within which the system and methods according to the present invention can provide the much-needed but often ignored time certainty.

Digital Document Processing

"Processing" may be viewed as the manipulation of data within a computer system. Since virtually all computer systems today process digital data, processing is the vital step between receiving the data in binary format (i.e., input), and producing results (i.e., output)—the task for which computers are designed.

The Microsoft® Press Computer Dictionary, 3d Edition (1997) defines the term document as "... any self-contained piece of work created with an application program and, if saved on disk, given a unique filename by which it can be retrieved." Most people think of documents as material done by word processors alone. To the typical computer, however, data is little more than a collection of characters. Therefore, a database, a graphic, or a spreadsheet can all be considered as much a document as a letter or a report. In the Macintosh environment in particular, a document is any user-created work named and saved as a separate file.

Accordingly, for the purpose of the invention described herein, digital document processing shall be interpreted to mean the manipulation of digital (i.e., binary) data within a computer system to create or modify any self-contained piece of work with an application program and, if saved on a disk or any other memory means, given a unique filename by which it can be retrieved. Examples of such application programs with which the present invention may be used to assist in such digital document processing are Microsoft® Access 97, Microsoft® Excel 97, and Microsoft® Word 97, each of which is available from Microsoft Corporation, Redmond, Wash. U.S.A.

Digital Communications

"Communications" may be broadly defined as the vast discipline encompassing the methods, mechanisms, and media involved in information transfer. In computer-related areas, communications usually involve data transfer from one computer to another through a communications medium, such as a telephone, microwave relay, satellite link, or physical cable.

Two primary methods of digital communications among computers presently exist. One method temporarily connects two computers through a switched network, such as the public telephone system. The other method permanently or semi-permanently links multiple workstations or computers in a network. In reality, neither method is distinguishable from the other, because a computer can be equipped with a modem, which is often used to access both privately owned and public access network computers.

More particular forms of digital communications (i.e., exchange of communications in which all of the information is transmitted in binary-encoded, digital format) include electronic mail (or less formally "e-mail"), facsimile, voicemail, and multimedia communications.

E-mail may be broadly defined as the exchange of text messages/computer files over a communications network, such as a local area network (LAN) or the Internet, usually between computers or terminals. Facsimile (or, again, less formally "fax") comprises the transmission and reception of text or graphics over telephone lines in digitized form. Conventional fax machines scan an original document, transmit an image of the document as a bit map, and reproduce the received image on a printer. Resolution and encoding of such fax messages are standardized in the CCITT Groups 1–4 recommendations. Fax images can likewise be sent and received by computers equipped with fax hardware and software.

The CCITT Groups 1–4 recommendations make up a set of standards recommended by the Comité Consultatif International Télégraphique et Téléphonique (now known as the International Telecommunication Union) for encoding and transmitting images over fax machines. Groups 1 and 2 relate to analog devices, which are generally out of use. Groups 3 and 4 deal with digital devices, and are outlined below.

Group 3 is a widespread standard that supports "standard" images of 203 horizontal dots per inch (dpi) by 98 vertical dpi, and "fine" images of 203 horizontal dpi by 198 vertical dpi. Group 3 devices support two methods of data compression. One is based on the Huffman code, and reduces an image to 10 to 20 percent (10%–20%) of the original. The other, known as "READ" (for "relative element address designate"), compresses an image to about six to twelve percent (~6%–12%) of its original. Additionally, the READ method provides for password protection as well as polling, so that a receiving machine can request transmission as appropriate.

Group 4 is a newer standard, which supports images of up to 400 dpi. Its method of data in compression is based on a beginning row of white pixels, or "dots", with each succeeding line encoded as a series of changes from the line before. Images are compressed to about three to ten percent (~3%–10%) of the original. Group 4 devices do not include error-correction information in their transmission. Moreover, they require an Integrated Services Digital Network (ISDN) phone line rather than a traditional dial-up line.

Fax modems may also be used to send and receive digital data encoded in known fax formats (e.g., one of the CCITT groups noted above). Such data is either sent or received by a fax machine or another modem, which then decodes the data and converts it to an image. If the data was initially sent by fax modem, the image must previously have been encoded on the computer hosting such fax modem. Text and graphic documents can be converted into fax format by special software that is usually provided with the fax modem. Paper documents must first be scanned in. As is well known, fax modems may be internal or external and may combine fax and conventional modem capabilities.

Voicemail generally comprises a system that records and stores telephone messages in a computer's memory. Unlike a simple answering machine, voicemail systems include separate mailboxes for multiple users, each of whom can copy, store, or redistribute messages. Another type of digital communications involving voice is "voice messaging", a term which generally refers to a system that sends and receives messages in the form of sound recordings. Typical voice messaging systems may employ "voice modems", which are modulation/demodulation devices that support a switch to facilitate changes between telephony and data transmission modes. Such a device might contain a built-in loudspeaker and microphone for voice communication, but more often it uses the computer's sound card.

Still another form of digital communications includes multimedia communications in the style of "video teleconferencing", as defined by the International Telecommunication Union (formerly CCITT) in "Visual Telephone Systems and Equipment for Local Area Networks Which Provide a Non-Guaranteed Quality of Service," (Recommendation H.323, Telecommunication Standardization Sector of ITU, Geneva, Switzerland, May 1996) and other similar such standards.

Digital Imaging

"Digital imaging" encompasses those known processes involved in the capture, storage, display, and printing of graphical images. They may involve devices known as a "digital camera", which broadly refers to a camera that stores photographed images electronically instead of on traditional film. Digital cameras typically use charge-coupled device (CCD) elements to capture the image through the lens when the operator releases the shutter in the camera. Circuits within the camera cause the image captured by the CCD to be stored in a storage medium, such as solid-state memory or a hard disk. After the image has been captured, it is downloaded by cable to the computer using software supplied with the camera. Once stored in the computer, the image can be manipulated and processed much like the image from a scanner or related input devices. Digital cameras come in the form of still cameras and full-motion video recorders.

Other forms of digital imaging include digitizing systems, such as the "PhotoCD®" system from Eastman Kodak Company, Rochester, N.Y. That system allows 35 mm film pictures, negatives, slides, and scanned images to be stored on a compact disc. Images are then stored in a file format known as the Kodak PhotoCD Image Pac File Format, or PCD. Many photography and film development businesses offer this service. Any computer with CD-ROM capabilities can usually view images stored on a PhotoCD and the software required to read PCD. Additionally, such images can be viewed by any one of a variety of players that are specifically designed to display images stored on CDs. Another photographic form of digital imaging is defined by the "Flashpix" specification, the cooperative endeavor of the Digital Imaging Group, Microsoft, the Hewlett-Packard Company, and Live Picture, Inc. The Flashpix format builds on the best features of existing formats (e.g., Kodak Image Pac, Live Picture IVUE, Hewlett-Packard JPEG, TIFF, TIFF/EP, etc.), and combines these features with an object orientated approach.

Still other forms of digital imaging include digital radiography, radiotherapy, x-ray, positron emission tomography, ultrasound, and magnetic resonance imaging according to the joint work of the American College of Radiology (ACR) and the National Electrical Manufacturers Association (NEMA), published in the *Digital Imaging and Communications in Medicine PS* 3-1998 (DICOM Standard).

Digital Commerce

An enormous amount of commercial activity now takes place by means of connected computers. Such commercial activity has been variously coined as digital commerce, electronic commerce, or just plain E-commerce. Regardless of its particular moniker, these activities generically involve a commercial transaction between a user and a vendor through an online information service, the Internet, or a BBS, or between vendor and customer computers through a specialized form of E-commerce known as electronic data interchange (EDT).

EDI is collectively known for its set of standards to control the transfer of business documents (e.g., purchase orders and invoices) between computers. The ultimate goal of EDI is the elimination of paperwork and increased response time. For EDI to be most effective, users must agree on certain standards for formatting and exchanging information, such as the X.400 protocol and CCITT X series.

Other known forms of E-commerce include digital banking, web-front stores, and online trading of bonds, equities, and other securities. Digital banking can take the form of access to a user's account, payment of bills electronically, or transfer of funds between a user's accounts. Web-front stores (e.g., amazon.com) usually comprise a collection of web pages in the form of an ty electronic catalog, which offers any number of products for sale. More often than not, transactions at such web-front stores are consummated when a purchaser enters his credit card number, and the issuing bank approves the purchase. These transactions may or may not be over secure lines, such as those designated "TRUSTe" participant web sites. Further details regarding known processes for establishing and maintaining secure E-commerce connections may be found in the *SET Secure Electronic Transaction Specification, Book 1: Business Description* (Version 1.0), May 31, 1997, the contents of which are incorporated herein by reference. See also *Book 2* (*Programmer's Guide*) and *Book 3* (*Formal Protocol Definition*) of the *SET Secure Electronic Transaction Specification*, as well as the *External Interface Guide to SET Secure Electronic Transaction*, Sep. 24, 1997, each of which is incorporated herein by reference.

One burgeoning form of E-commerce that has arisen in the past few years is that which involves dealing in securities online. "Day traders" watch impatiently as ticker symbols speed across their computer screens. When the price is right, they electronically whisk their order off to a distant securities dealer—often buying and selling the same stock or bond in a fifteen-minute span of time. One can only imagine the potential problems associated with the purchase or sale of securities when price-per-share movements on the order of a few cents make the difference to these day traders. Fortunately, the National Association of Securities Dealers (NASD) has come up with its Order Audit Trail Systems (OATS$^{SM}$) to track all stock transactions. NASD Rule 6953 also requires all member firms that have an obligation to record order, transaction, or related data under the NASD Rules or Bylaws to synchronize the business clocks that are used for recording the date and time of any market event. Computer system and mechanical clocks must be synchronized every business day before market open, at a minimum, in order to ensure that recorded order event timestamps are accurate.

Digital Justice

Even legal scholars and systems around the world have been unable to escape the problems of an online world. Utah became the first jurisdiction in the United States of America to enact legislation creating "cybernotaries". Similar laws in Georgia, Florida, and Massachusetts quickly followed Utah.

In August 1996, the American Bar Association (through its Information Security Committee e of the Electronic Commerce and Information Technology Division, Section of Science and Technology) published the *Digital Signature Guidelines—Legal Infrastructure for Certification Authorities and Secure Electronic Commerce*. The European Union, as well, in a final report on the *Legal Issues Of Evidence And Liability In The Provision Of Trusted Services* (*CA and TTP Services*), let its position be known in October 1998.

Each of the environments noted above is fraught with potential fraud. Any reliance they may have on dates and times is merely for the purpose of determining whether the transaction is valid (ie., authorized within a specified range of time), or what specific time delays occur in the transmission of data between the computer systems communicating with one another. However, none of those environments currently provide means for proving—with certainty—dates and times associated with access, creation, modification, receipt, or transmission of digital data files, which may be used therein.

Prior Art Attempts to Solve the Problem

Many-varied computing means pervade today's society. PCs, web browsers, e-mail clients, e-mail servers, network file servers, network messaging servers, mainframes, Internet appliances, wireless telephones, pagers, PDAs, fax machines, fax modems, digital still cameras, video cameras, voice recorders, video recorders, copiers, and scanners, and virtually any other device using digital data files are fast becoming ubiquitous.

Digital data is easy to modify. As a result, it has been nearly impossible in the prior art to establish with certainty the date and time a particular digital data file in a given computing means was accessed, created, modified, received, saved, or transmitted. It should be understood that, by use of the term "computing means", the present invention is directed to general purpose computers, PCs, web browsers, e-mail clients/servers, network file/messaging servers, mainframes, Internet appliances, wireless telephones, pagers, PDAs, fax machines, digital still/video cameras, digital voice/video recorders, digital copiers/scanners, interactive television, hybrid combinations of any of the above-noted computing means and an interactive television (e.g., set-top boxes), and any other apparatus, which generally comprises a processor, memory, the capability to receive input, and the capability to generate output.

Such computing means typically include a real time clock ("RTC") for keeping track of the time and date. Likewise, operating systems and/or applications programs used in such computing means usually stamp the time and date (as derived from the RTC) that each of the digital data files is accessed, created, modified, received, saved, or transmitted. Such stamping of digital data files with times and dates (collectively referred to as "time-stamping") has, thus, become an integral part of all of the above known computing environments.

Although the existing framework of time-stamping can be used to catalogue and sort one's own files, for other critical needs it suffers from two fatal flaws. Files are typically "time-stamped" with a value read from the RTC. There is no simple way of determining whether the RTC is set to the correct date and time. Indeed, it is quite trivial for a user to reset the RTC to any desirable date and time. Even if the computing means' RTC had been correctly set, nothing would prevent a user from arbitrarily changing the "time-stamps" themselves. This is readily accomplished through the direct manipulation of the digital data where the time-stamp is stored.

Thus, the known time-stamping framework is useless for any situation where the accuracy of the date or time of a digital data file is critical. Court filings, medical records, files presented as incriminating or exculpatory evidence in court cases, legal documents such as wills, billing records, patent, trademark, and copyright claims, and insurance documents are only a few of the areas where the date and time that is associated with the file is critical. Conventional systems and methods that time-stamp digital data files fail to meet this need. Furthermore, there is no "open", cross-platform, interoperable global standard in place to create trusted time-stamps.

Cryptographic Systems and Keys

One approach that has been used in the past to provide some level of security in digital data files is the use of cryptographic systems and keys. In general, cryptographic systems are used to encrypt or "lock" a digital data file. A key is used, conversely, to decrypt or "unlock" an encrypted digital data file. Digital data files are merely bits of data in memory or on a network. If this data is viewed as the mere representation of large numbers, then mathematical functions or algorithms can be easily applied to the data.

For example, where a particular digital data file is a text file, its unencrypted or "cleartext" version can be viewed as the variable x. The resulting function of this variable x, when encrypted by its associated cryptographic algorithm and coupled with its key k will be f (k, x). Accordingly, the encrypted text or "cyphertext" can be defined by the equation:

$$y=f(k,x).$$

By choosing the cryptographic algorithm carefully—such that there is no easily discovered inverse mapping (i.e., for any given y, it will be extremely difficult to calculate x without knowing k, while at the same time, with knowledge of k it will be possible)—the data may be encrypted.

Symmetric Cryptography

If the key for encryption and decryption is the same shared secret, then the cryptographic system and associated algorithm will be referred to as "symmetric". Both the sender and the receiver must share the key in such symmetric cryptographic systems. A sender first applies the encryption function using the key to the cleartext to produce the cyphertext, which is then sent to a receiver. The receiver applies the decryption function using the same shared key. Since the cleartext cannot be derived from the cyphertext without knowledge of the key, the cyphertext can be sent over public networks such as the Internet.

The current United States standard for symmetric cryptography, in which the same key is used for both encryption and decryption, is the Data Encryption Standard (DES), which is based upon a combination and permutation of shifts and exclusive ors. This approach can be very fast, whether implemented directly on hardware (e.g., I GByte/sec throughput or better) or in general purpose processors. The current key size of 56 bits (plus 8 parity bits) is sufficient, yet somewhat small, but the growing use of larger keys with "triple DES" generate much greater security. Since the implementation of DES is fast, it can easily be pipelined with software codecs and not impact system performance.

An alternative and yet stronger form of symmetric block encryption is IDEA. Its security is based upon combining exclusive ors with addition and multiplication in modulo-16 arithmetic. The IDEA approach is also fast on general purpose processors. It is comparable in speed to known DES implementations. One major advantage of IDEA is its keys, which are 128 bits and are, thus, much stronger (i.e., harder to break) than standard 56-bit DES keys.

One particular problem with the use of such symmetric systems is the problem of getting the sender and the receiver to agree on the key without anyone else finding out. Moreover, the problem becomes greatly complicated when additional users (i.e., potential senders and receivers) are added to the system. Such symmetric cryptographic systems, nevertheless, are by far easier to implement and deploy than their asymmetric counterparts since they require far less infrastructure. Sometimes with a symmetric cryptographic system, however, keys are submitted over the network. Avoidance of this security risk would be desirable.

Asymmetric Cryptography

Systems that generate and employ a secure key pair (i.e., a "private key" for creating the "digital signature" and a "public key" to verify that digital signature) are typically known as asymmetric cryptographic systems. There are many known cryptographic algorithms (e.g., RSA, DSA, and Diffie Hellman) that involve a key pair. In such asymmetric cryptographic systems, the private key and the public key are mathematically linked. The private key can only decrypt anything that is encrypted by the public key. Conversely, the public key can only verify anything that is signed by the private key. Asymmetric cryptographic systems are, thus, inherently more secure than symmetric or shared secret systems. The sensitive private key need exist in only one place. No form of the private key is ever transmitted over the network. Typical asymmetric cryptographic systems also scale to many users more easily than shared secret systems. However, the infrastructure that is necessary to field systems of this type, commonly called a "Public Key Infrastructure" (PKI), is non-trivial to implement. See, e.g., RFC 1422, *Privacy Enhancement for Internet Electronic Mail: Part II: Certificate-Based Key Management* (February 1996), the contents of which are incorporated herein by reference.

Digital Signatures

Referring now to FIGS. 1 and 2, wherein like reference characters or numbers represent like or corresponding parts throughout each of the several views, an exemplary process 100 for creating a digital signature is shown in FIG. 1. To sign a document, or for that matter any other digital data file, a "signer" must first delimit the borders of the digital data file to be signed. As used herein, the term signer refers to any person who creates a digital signature for a message, such as message 110. The information delimited by the signer, in turn, refers to that message 110. A hash function 120 in the signer's software is used to compute a hash result 130, which is unique for all practical purposes to the message 110. Thereafter, a signing function 140 is used to transform the hash result 130 into a digital signature 160, but only after input of the signer's private key 150.

This transformation is sometimes referred to as a process of encryption. However, such a characterization would be inaccurate, because message 110 itself may, or may not be confidential. Confidentiality may be provided as an optional feature in most digital signature technologies, but the separate and distinct security service of confidentiality is not central to the security services of signer authentication, document authentication, or digital data file authentication. In any case, the resulting digital signature 160 is unique to both the message 110 and the private key 150, which is used to create the digital signature 160.

Typically, most digital signatures 160 (i.e., the digitally-signed hash result of message 110) are used in one of two ways. They may be attached to their associated message 110 and, thereafter, simply stored. In the alternative, they may be copied 170 and coupled with digital signature 160, in the form of a single data element 180 and, thereafter, transmitted 190 to a verifier.

This single data element 180 is, in some cases as will be described in greater detail herein below, referred to as a "digital certificate". Furthermore, the digital signature 160 may be simply transmitted or stored as a separate data element, so long as it maintains a reliable association with its message 110. Each digital signature 160 is unique to the specific message 110, which has been used to create it. Otherwise, it would be counterproductive if the digital signature 160 was wholly disassociated from that message 110.

An exemplary verification process 200 for verifying digital signature 160 is shown in FIG. 2. Element 180, comprising digital signature 160 attached to message 110, is first received 190 from the signer. A new hash result 220 of the original message 110 is then computed by the verifier by means of the same hash function 120 used to create the digital signature 160.

It should be noted at this juncture that use of the term "to verify" herein, with respect to any given digital signature, message, and public key, refers to those processes of accurately determining that: (1) the digital signature 160 was created during the "operational period" of a valid certificate 180 by the private key 150 corresponding to the public key 260 listed in the certificate 180; and (2) the message 110 had not been altered since its digital signature 160 was created.

It should also be noted at this juncture that use of the term "operational period" herein refers to a period that begins on a date and time a certificate 180 is issued by a "certification authority", or on a later date and time certain if stated in the certificate 180, and ends on a date and time it expires or is earlier revoked or suspended.

Then, by use of the public key 260 and such new hash result 220, the verifier can check: (1) whether the digital signature 160 was created using the signer's private key 150; and (2) whether the newly computed hash result 220 matches the original hash result 130, which was transformed into the digital signature 160 during the signing process.

Most known verification software will confirm the digital signature 160 as "verified" if two conditions are satisfied. One condition will be satisfied if the signer's private key 150 was used to digitally sign the message 110. This condition will be met if the signer's public key 260 was used to verify the digital signature 160, because the signer's public key 260 is capable of verifying only a digital signature 160 that is created with the signer's private key 150. The other condition will be satisfied if message 110 was received unaltered. This condition will be met if the hash result 220 that is computed by the verifier turns out to be identical to the hash result 130 that is extracted from digital signature 160 during the verification process. A verifier function 240 is used to make these comparisons, while further processing of the message 110 is dependent upon whether message 110 is determined to be valid at step 280.

Digital Certificates

The term "digital certificate" as used herein generally refers to any message, which at least (1) identifies the certification authority (CA) issuing it; (2) names or identifies its "subscriber"; (3) contains the subscriber's public key; (4) identifies its operational period; and (5) is digitally signed by the CA issuing it. Metaphorically, digital certificates serve as electronic substitutes for a sealed envelope or a signer's signature. In one case, for example, VeriSign Digital IDT™ (a trademark of VeriSign, Inc., Mountain View, Calif.) securely resides in a signer's Internet browser or e-mail software, and enables that signer to digitally sign and encrypt e-mail. Digital certificates can also be viewed as electronic equivalents of a driver's license or a passport. Containing information that uniquely identifies the signer, the digital certificate allows the signer to: (1) digitally sign a message so the recipient knows that a message actually originated from the signer; and (2) encrypt a message so the intended recipient can decrypt and read its contents and attachments. Most digital certificates are easy to use, with point-and-click interfaces in all of the popular browsers and e-mail packages. A person seeking to verify a digital signature needs, at a minimum, (1) the public key corresponding to the private key used to create the digital signature, and (2) reliable evidence that the public key (and thus the corresponding private key of the key pair) is identified with the signer. The basic purpose of the digital certificate is to serve both these needs in a reliable manner.

Dual Signatures

As noted herein above, digital signatures and digital certificates have both been used in the past to provide some level of certainty as to the identity of a particular person accessing, creating, modifying, receiving, saving, or transmitting a digital data file. E-commerce presents other challenges for securing digital data files. In particular, the process of providing secure electronic transactions has raised the concerns for maintaining a person's privacy. An approach that has been used in the past to provide such security is known as "dual signatures", and is illustrated below.

User B wants to send User A an offer to purchase a piece of property that User A owns and an authorization to his bank to transfer the money if User A accepts the offer. Nevertheless, User B does not want the bank to see the terms of his outstanding offer to User A, nor does he want User A to see his bank account information. User B also wants to link his offer to the transfer such that the money will only be transferred if User A accepts his offer. According to the *SET Secure Electronic Transaction Specification*, User B accomplishes all of this by digitally signing both messages with a single signature operation that creates a dual signature.

Such a dual signature is generated in four steps. First, a message digest is created for both messages sent by User B (ie., one to User A, and one to the bank). The resulting pair of message digests is then concatenated together. Next, a message digest of the concatenated result is created. This third message digest is finally encrypted with the User B's private signature key. User B must include the message digest of the other message in order for a recipient to verify his dual signature. The recipient of either message can then check its authenticity by generating the message digest on its copy of the message, concatenating it with the message digest of the other message (as provided by the User B), and thereafter computing the message digest of the result. If the newly generated digest matches the decrypted dual signature, the recipient can trust the authenticity of the message.

In the event that User A accepts User B's offer, she sends a message to the bank indicating her acceptance and including the message digest of the offer. The bank can verify the authenticity of User B's transfer authorization, and ensure that the acceptance is for the same offer by using its digest of the authorization and the message digest presented by User A of the offer to validate the dual signature. On the one hand, the bank can therefore check the authenticity of the offer against the dual signature. It cannot, on the other hand, see the terms of the offer.

Further details regarding such known processes may be found in the *SET Secure Electronic Transaction Specification, Book 1: Business Description*(Version 1.0), May 31, 1997, the contents of which are incorporated herein by reference. See also *Book 2(Programmer's Guide)* and *Book 3(Formal Protocol Definition)* of the *SET Secure Electronic Transaction Specification*, as well as the *External Interface Guide to SET Secure Electronic Transaction*, Sep. 24, 1997, each of which is incorporated herein by reference.

As is best illustrated by reference to FIG. 3, the process of creating such dual signatures will now be described in greater detail. User A runs the property description 305 through a one-way algorithm 310 to produce a unique value known as the message digest 315. This is a kind of digital fingerprint of the property description 305, and will be used later to test the integrity of the message. She then encrypts the message digest 315 with her private signature key 320 to produce her digital signature 325. Next, she generates a random symmetric key 330 and uses it to encrypt the combination of the property description 305, her signature 325 and a copy of her certificate 335 containing her public signature key 340 (collectively referred to as the message 345).

To decrypt the property description 305, user B will require a secure copy of this random symmetric key 330. User B's certificate 350, which user A must have obtained prior to initiating secure communication with him, contains a copy of his public key-exchange key 355. To ensure secure transmission of the symmetric key 330, user A encrypts it first using user B's public key-exchange key 350. The encrypted key, referred to as the digital envelope 360, will then be sent to user B along with the encrypted message 345 itself.

Likewise, the decryption process consists of the following steps. User B receives the message 345 from user A and decrypts the digital envelope 360 with his private key-exchange key 365 to retrieve the symmetric key 330. He uses the symmetric key 330 to decrypt the property description 305, user A's signature 325, and her certificate 335. He decrypts user A's digital signature 325 with her public signature key 340, which he acquires from her certificate 335. This recovers the original message digest 315 of the property description 305. He runs the property description 305 through the same one-way algorithm 310 used by user A and produces a new message digest 370 of the decrypted property description 305. Finally, he compares his message digest 370 to the one 315 obtained by use of user A's public signature key 340 contained within her digital signature 325. If both digests 315, 370 are exactly the same, user B then confirms that the message content has not been altered during transmission and that it was signed using user A's private signature key 320. On the other hand, if digests 315, 370 are not the same, then message 305 either originated somewhere else or was altered after it was signed. User B could then elect to take some appropriate action, such as notifying user A or discarding the message 305.

Digital Time-Stamps

A digital time-stamping service (DTS) issues time-stamps, which associate a date and time with a digital document in a cryptographically strong way. The digital time-stamp can be used at a later date to prove that an electronic document existed at the time stated on its time-stamp. For example, a physicist who has a brilliant idea can write about it with a word processor and have the document time-stamped. The time-stamp and document together can later prove that the scientist deserves the Nobel Prize, even though an arch rival may have been the first to publish.

The manner in which such conventional time-stamping systems work is illustrated in FIG. 4. Hypothetically, a user at a computing means 400 signs a document and wants it time-stamped. The user first computes a message digest 420 of the document using a secure hash function, and second sends the message digest 420 (but not the document itself) to the DTS 440. The DTS 440 sends the user in return a digital time-stamp 460 consisting of the message digest, the date and time it was received at the DTS 440, and the signature 480 of the DTS 440. Since the message digest 420 does not reveal any information about the content of the document, the DTS 440 cannot eavesdrop on the documents it time-stamps. Thereafter, the user can ostensibly present the document and time-stamp 460 together to prove when the document was written. A verifier then computes the message digest 420 of the document, makes sure it matches the digest in the time-stamp 460, and verifies the signature 480 of the DTS 440 on the time-stamp 460.

To be reliable, the time-stamps must not be forgeable. The DTS 440 itself must have a long key if the time-stamps are to be reliable for long periods of time (e.g., several decades). Moreover, the private key of the DTS 440 must be stored with utmost security, as in a tamperproof box. The date and time must come from a clock, also inside the tamperproof box, which cannot be reset and which will keep accurate time for years or perhaps for decades. It must also be infeasible to create time-stamps without using the apparatus in the tamperproof box.

All of the above requirements greatly complicate the process of obtaining legally sufficient proof of the date and time a digital data file was accessed, created, modified, received, saved, or transmitted. In fact, time-stamping a document in the manner described above only certifies the date and time that the message digest 420 was received by the DTS. It provides no proof of the date and time that the document was accessed, created, modified, saved, or transmitted. Moreover, because the DTS is located remotely relative to the user, there is no reliable way to provide a digital time-stamp locally at the user's site.

One cryptographically-strong DTS, first implemented by Bell Communications Research, Inc. (also known as "Bellcore"), only uses software and avoids many of the requirements just described such as tamperproof hardware. It essentially combines hash values of documents into data structures known as binary trees. The "root" values of such binary trees are then periodically published in the newspaper. In these Bellcore systems, the time-stamp consists of a set of hash values, which allow a verifier to recompute the root of the tree. Since the hash functions are one-way, the set of validating hash values cannot be forged. The time associated with the document by the time-stamp is the date of publication.

The following Bellcore patents are illustrative of the above-described approach: U.S. Pat. No. 5,136,646, for "Digital Document Time-Stamping With Catenate Certificate" (Haber et al.); U.S. Pat. No. 5,136,647, for a "Method for Secure Time-Stamping of Digital Documents" (Haber et al.); U.S. Pat. No. 5,373,561, for a "Method for Secure Time-Stamping of Digital Documents" (Haber et al.); and U.S. Pat. No. Re. 34,954, which is the reissue of the '647 patent noted above and is, likewise, directed to a "Method for Secure Time-Stamping of Digital Documents" (Haber et al.). Other patents which are illustrative of similar such approaches are U.S. Pat. No. 5,748,738, for a "System and Method for Electronic Transmission, Storage and Retrieval of Authenticated Documents" (Bisbee et al.), which is assigned to Document Authentications Systems, Inc.; and U.S. U.S. Pat. No. 5,781,629, for a "Digital Document Authentication System" (Haber et al.), which is assigned to Surety Technologies, Inc. The contents of each of the above patents are incorporated herein by reference.

While each of the above approaches uses software and avoids many of the requirements for tamperproof hardware, they still require a trusted source at a remote location. None of the patents listed above teach or suggest any system or method that is capable of providing a trustworthy time-stamp at the precise location where the user's digital data files are accessed, created, modified, received, saved, or transmitted. Moreover, all of the methods described in the patents listed above still leave open the possibility that two individuals may collude to falsely state the value of a hash.

Undetected alterations may still be made with appropriate cryptographic techniques. For example, one may alter a document as desired and then make other suppressed changes, such as a carriage return followed by a space-up command. Both original document and altered document may, therefore, have the same hash value. See, for example, B. Schneier, *Applied Cryptography*, Chapter 3.8, "Timestamping Services", pages 61–65 (John Wiley & Sons, Inc. 1994), the contents of which are incorporated herein by reference.

One approach seeking to avoid such possibilities is described in U.S. Pat. No. 5,781,630 (Huber et al), which discloses a system including a cryptomodule that is coupled to a computer. A cryptomodule in accordance with the Huber at al. patent includes a processor; an interface coupling the processor to the computer; and memory containing algorithms and constants for three purposes: (1) encoding a document, (2) generating a digital signature to be appended to the document, and (3) producing a time-stamp to be inserted into the document. The cryptomodule also includes a pair of clocks, one of which is a radio clock and the other of which is a "non-adjustable" quartz clock.

This system according to the '630 patent depends on a comparison of the two clocks before inserting a time-stamp into the document. That is, the time that the document was created, edited, received, saved, or transmitted is retrieved from both clocks and compared. Any discrepancy between the times retrieved is then determined. If, and only if, those discrepancies are sufficiently small, will a time-stamp based on the radio clock be inserted into the document and the document then encoded.

Another approach, which seeks to avoid problems of collusion and/or fraud, is described in U.S. Pat. No. 5,619,571 (Sandstrom et al.). Briefly summarized, Sandstrom et al. discloses an improved method of storing or retrieving electronic records, particularly those in the form of image streams (e.g., TIFF). An image identification code, time data provided by a trusted source, and a password are combined to generate a key. The image identification code and time data are stored in a public directory associated with the image data stream. Attributes of the image stream (e.g., its size and a hash of at least a segment of the image data) are also determined. The attributes are then used to generate a verification code. Subsequently, the verification code is first positioned within a private area associated with the data image stream, and then the private area is encrypted with the previously generated key.

This approach, however, suffers from two obvious disadvantages. Not only is it limited to image file formats having public and private areas, but it is also still dependent on a remote source for the time-stamp and the image identification code. It would be much more desirable to provide systems and methods of time-stamping digital data files locally and without the continuing reliance on a remote trusted source.

Still another approach to provide authenticated documents, with an authenticated time code, is described in U.S. Pat. No. 5,189,700 (Blandford). Blandford's device includes an RTC and an encryption means, which are together sealed in a tamperproof package. Powered by a battery that is located outside the tamperproof package, the RTC is used either: (1) to supplant the system clock of a computer, such that the computer cannot be booted up with an incorrect time; or (2) to provide an encrypted authentication code of time. Such time code is derived from a time retrieved from the RTC, which is combined with a device identification number. A secret key contained within the encryption means then encrypts the combination.

While devices according to Blandford, in fact, meet the objective of provided a local source of trusted time, they nevertheless suffer from two major disadvantages. Both disadvantages arise out of the design requirements of such devices. First, Blandford requires the RTC to override the computer's system clock on boot up. It would be much more desirable to avoid changing system settings in the computer, particularly the setting of its system clock. Second, Blandford requires that the RTC be powered by a source (i.e., the battery) outside of the tamperproof package. This, it is suggested, is critical to assuring several objectives: (1) ensuring that the RTC cannot be reset, or it can be reset only under strict procedures; (2) allowing the battery to be replaced in the power-up state without affecting the RTC; and (3) disabling the device, and potentially even the computer, in the event that power from the source failed. Obviously, it would be much more desirable to avoid such inconveniences.

SUMMARY OF THE INVENTION

It is, therefore, a general object of the present invention to provide novel systems, apparatus, and methods of preventing fraud in digital data files. More specifically, it is a particular object of this invention to provide systems, apparatus, methods, and articles of manufacture for proving the integrity of digital data files. Another more particular object of the present invention is to provide such systems, apparatus, methods, and articles of manufacture for time-stamping digital data files, which do not continually rely on a remote trusted source of time.

In accordance with one important aspect of the present invention, the systems and methods are directed to computing means. Non-limiting examples of such "computing means" include any: general purpose computer; mainframe; PC; web browser; e-mail client; e-mail server; network file or messaging server, Internet appliance; wireless telephone; pager; personal digital assistant (PDA); fax machine; digital still or video camera; digital voice or video recorder; digital copier or scanner; interactive television; hybrid combination of any of the above computing means and an interactive television; or any other apparatus comprising a processor, memory, the capability to receive input, and the capability to generate output. Apparatus according to the present invention also includes such computing means programmed with software to operate the computing means in accordance with the invention.

According to another important aspect of the present invention, the article of manufacture disclosed herein comprises a computer-readable medium embodying code segments to control a computer to perform the invention. Non-limiting examples of such "computer-readable medium" in this regard include any: magnetic hard disk; floppy disk; optical disk, (e.g., a CD-ROM, a CD-R, a CD-RW, or any disk compliant with known DVD standards); magneto-optical disk; magnetic tape; memory chip; carrier wave used to carry computer-readable electronic data, such as are used in transmitting and receiving e-mail or in accessing a network, including the Internet, intranets, extranets, virtual private networks (VPN), local area networks (LAN), and wide area networks (WAN); or any other storage device used for storing data accessible by a computer. Non-limiting examples of "code segments" include not only source code segments and object code segments, but also computer programs in any language, instructions, objects, software, or any means for controlling a computer.

The above and other objects and aspects according to the present invention are provided by a system and methods for proving dates of digital data files, which generally comprises a trusted time source, means for saving the file at a moment in time, API means for selectively retrieving from the trusted time source a date and a time corresponding to the moment in time, and means for appending the date and the time retrieved from the trusted time source to the saved file. Such system and methods may further comprise means for signing the saved file with the date and the time retrieved from the trusted time source appended thereto, means for hashing the signed file to produce a digest, means for signing the digest with a key to produce a certificate, means for appending the certificate to the saved file, and means for saving the file with the certificate appended thereto. All of the foregoing means are preferably sealed together within a tamperproof environment.

DETAILED DESCRIPTION OF THE INVENTION

Figure 1:
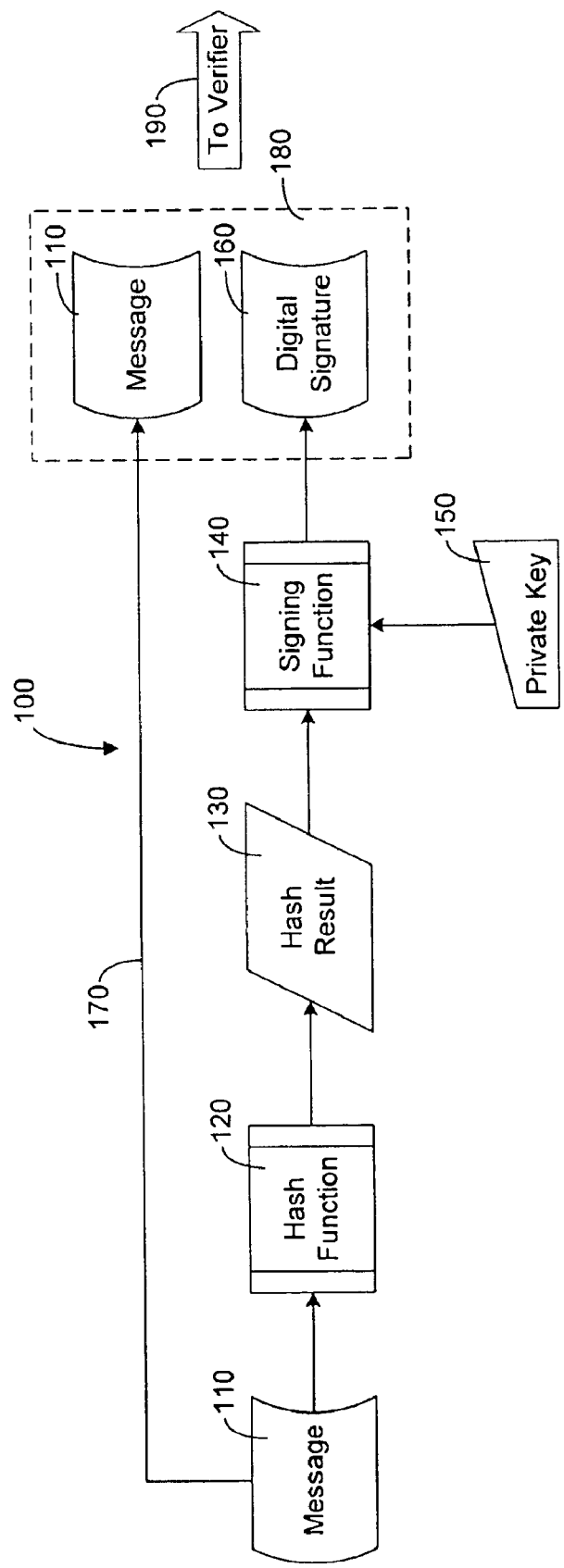
FIG. 1 is a block diagram, which illustrates one conventional process for creating a digital signature.
Figure 2:
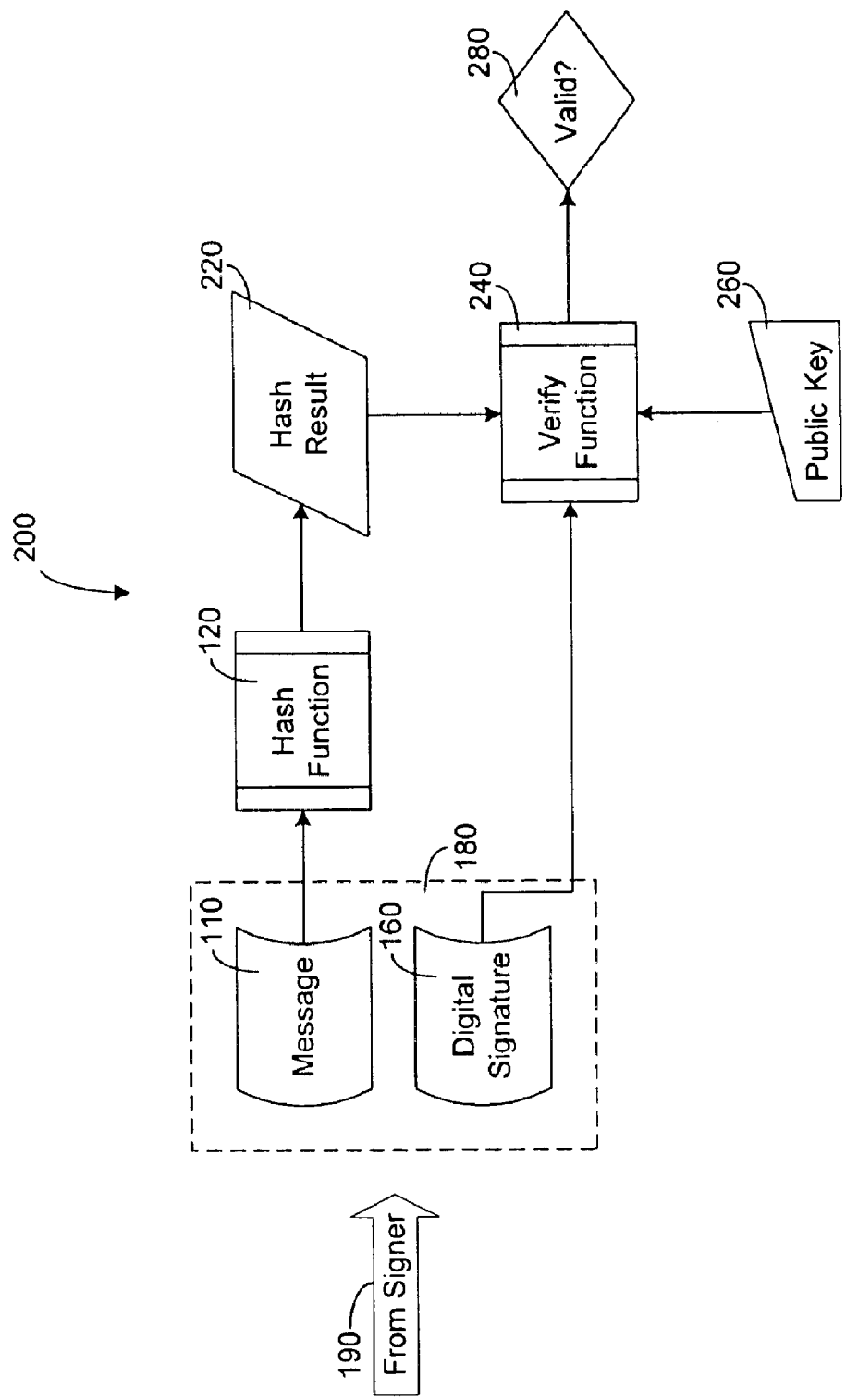
FIG. 2 is a block diagram, which illustrates another conventional process for verifying the digital signature created by the process shown in FIG. 1.
Figure 3:
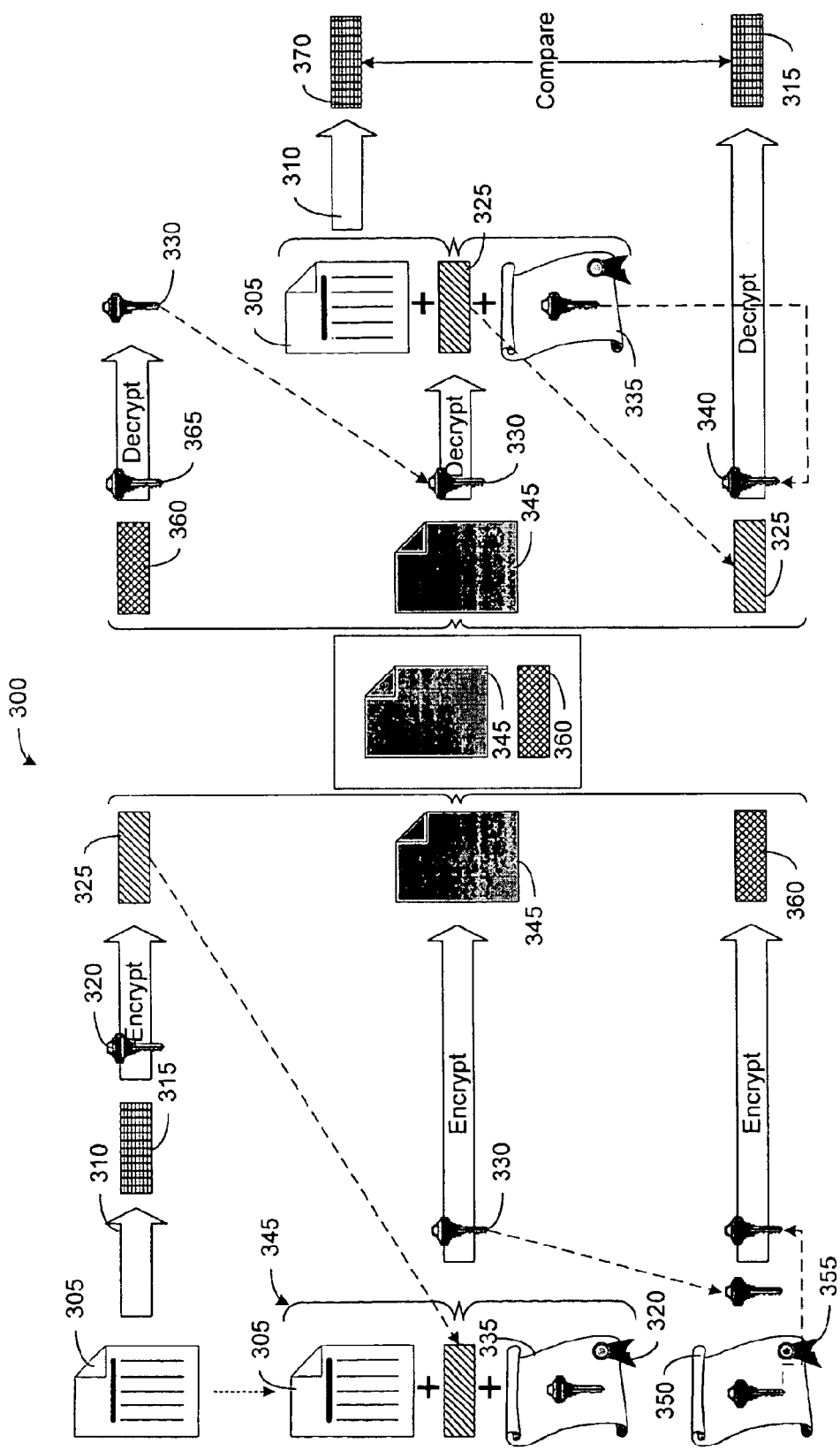
FIG. 3 is a block diagram, which illustrates yet another conventional process of using dual signatures to maintain privacy in secure electronic transactions.
Figure 4:
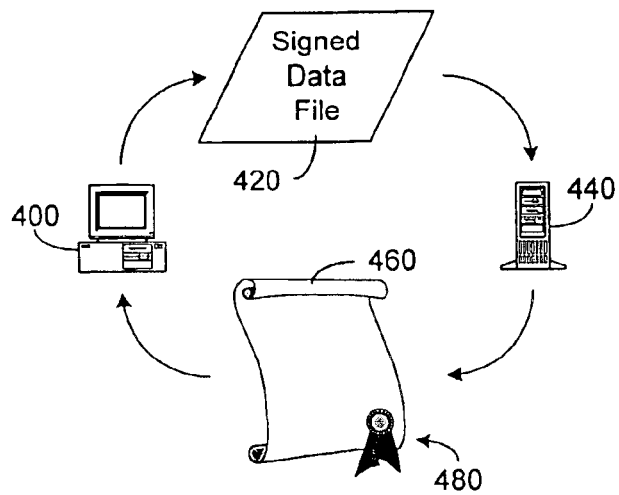
FIG. 4 is a block diagram, which illustrates a conventional digital time-stamping service.
Figure 5:
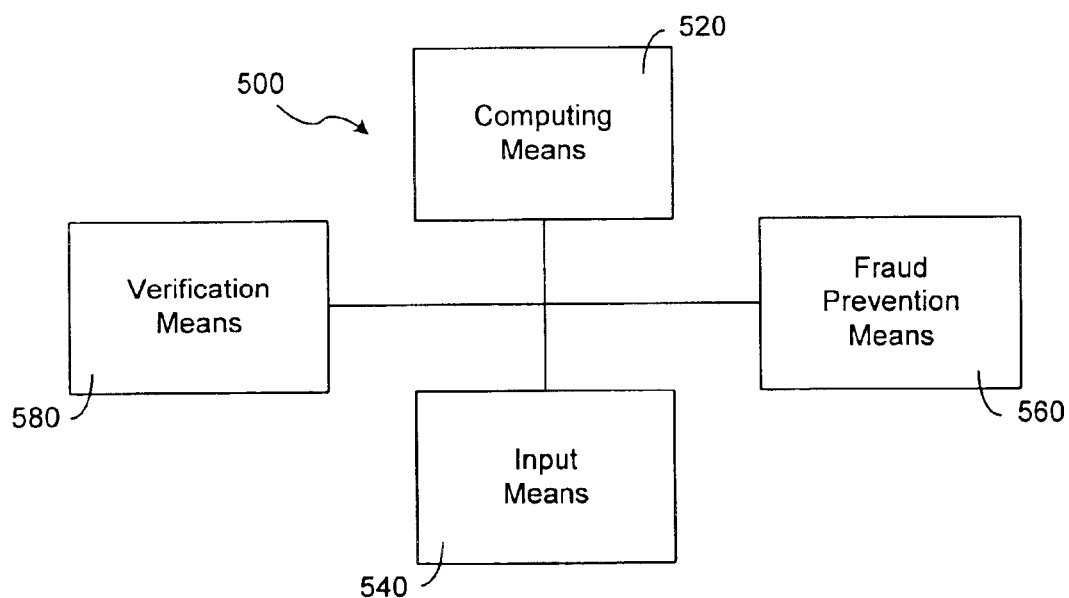
FIG. 5 is a block diagram, which generally illustrates the system according to the present invention.

A system 500 according to the present invention is shown generally in FIG. 5. System 500 suitably comprises a computing means 520, an input means 540, and a fraud prevention means 560, each of which is operatively coupled together. Computing means 520 more specifically comprises a general-purpose computer, such as a personal computer (PC). Input means 540 more specifically comprises any conventional means of inputting digital data to a PC such as a keyboard, a mouse, a touchpad, etc.

Suitable such keyboards include those of the type manufactured by Key Tronic Corporation, Spokane, Wash., U.S.A., and sold under the trademark Lifetime™. These include the Lifetime Classics™, a standard 104-key keyboard adapted for use with PS/2 or AT-style keyboard ports; the Lifetime Classic WirelessT™, a battery-operated standard keyboard adapted for use with PS/2 or AT-style keyboard ports through infrared means; the Lifetime Trackball™ and Lifetime Trackball Wireless™, both of which are standard keyboards with an integrated trackball mechanism; and, the Lifetime Touchpad™ and Lifetime Touchpad Wireless™, both of which are standard keyboards having an integrated touchpad.

Other suitable input means 540 include those of the type manufactured by Interlink Electronics, Camarillo, Calif., U.S.A., which employ VersaPade and VersaPoint® technologies. These include the Model VP9000 ePad™, a semiconductive touchpad and pen input pad that combines the functionalities of a PC touchpad pointing device and a WinTab-compatible graphics digitizer tablet; the Desk-Stick™ stationary desktop mouse; the RemotePointPLUS™ cordless, programmable mouse; and the FreedomWriterPRO™, a wireless, "all in one" PC input device that replaces pen, mouse, and keyboard for Internet conferencing, group meetings and presentations.

Computing means 520 and input means 540 together, thus, provide a system for creating a digital data file (not shown in FIG. 5). The digital data file is initially created by the computing means 520, either: (1) by entry of data through the input means 540; or, (2) storage of data in the computing means 520. Such storage of data in the computing means 520 may be accomplished through any number of conventional avenues (e.g., e-mail, downloading the digital data file from an Internet website, ftp transfers, and transfers by way of removable media, such as magnetic media including floppy disks, "Super Disks", Clik! ™, Zip™ and Jazz disks (all of which are trademarks of Iomega Corporation, Roy, Utah, U.S.A.); optical media, such as CD-ROM, CD-R, CD-RW and DVD; magneto-optical media, etc.).

In the event that a user (not shown) of the computing means 520 locally creates the digital data file, such digital data file would subsequently be saved at a moment in time. Fraud prevention means 560 is used, according to a particularly important aspect of the present invention, to secure the digital data file by maintaining its integrity in the following manner. An unalterable time-stamp is affixed to the digital data file by fraud prevention means 560 by way of computing means 520. Such a time-stamp may thereafter be used to confirm the date and time associated with any access, creation, modification, receipt, or transmission of the digital data file.

Figure 6:
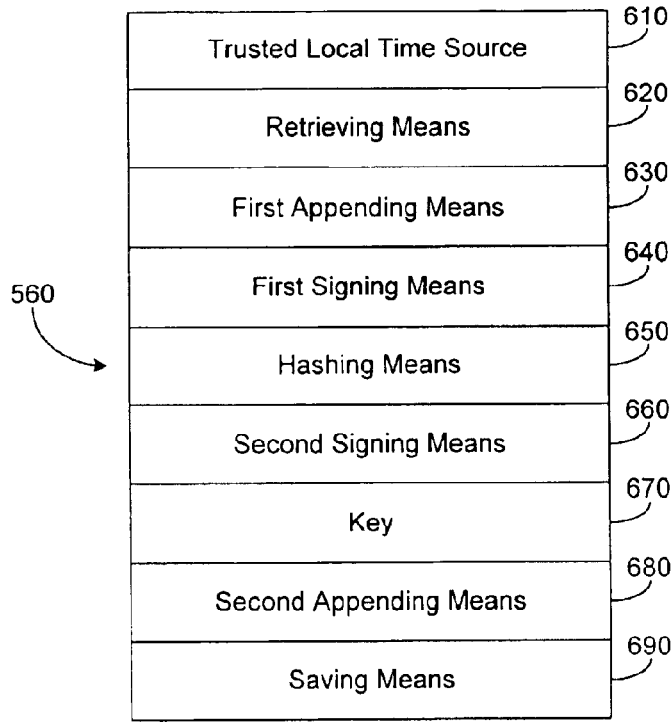
FIG. 6 is a block diagram, which more specifically illustrates the system shown in FIG. 5.

Several embodiments of the present invention will now be described herein after in greater detail with reference to FIGS. 7–12. However, as shown in FIG. 6, fraud prevention means 560 generally comprises a trusted local time source 610; means 620 for retrieving from that local time source 610 a date and a time corresponding to the moment in time that the digital data file was accessed, created, modified, received, or transmitted; means 630 for appending the date and the time retrieved from the trusted time source 610 to the saved digital data file; means 640 for signing the saved digital data file with the date and the time retrieved from the trusted time source 610 appended thereto; means 650 for hashing the signed digital data file to produce a digest; means 660 for signing the digest with a key 670 to produce a certificate; means 680 for appending the certificate to the saved digital data file; and means 690 for saving the digital data file with the certificate appended thereto.

Figure 7:
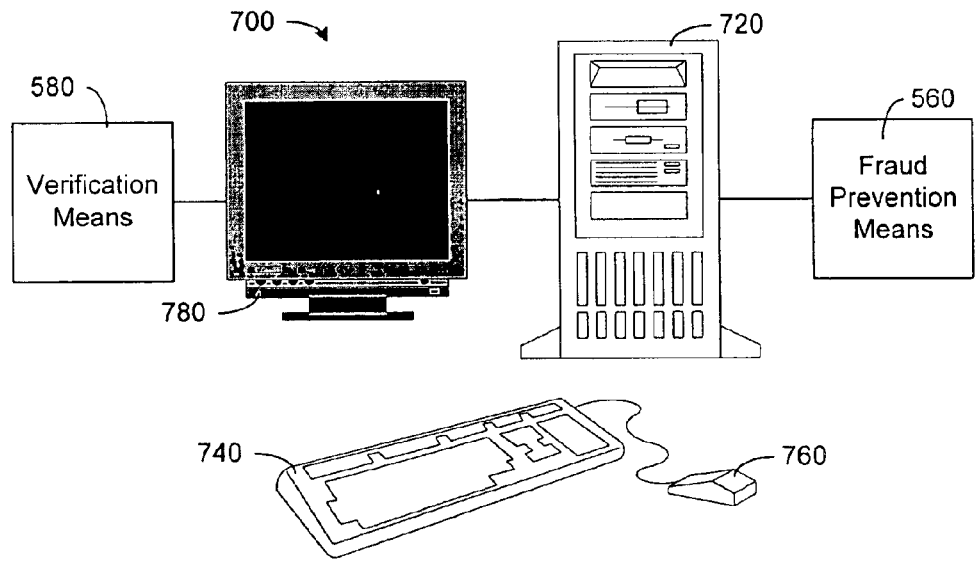
FIG. 7 is a block diagram of a presently preferred embodiment of the PC system according to the present invention.

Referring now to FIG. 7, a block diagram of a presently preferred embodiment of the PC system 700 according to the present invention is shown. System 700 generally comprises a PC 720, having a keyboard 740 and mouse 760 attached thereto for inputting digital data into the PC 720, fraud prevention means 560 for proving with certainty the dates and go times that digital data files contained within the PC 720 were accessed, created, modified, stored, or transmitted, and a monitor 780 for displaying such files. As an option, PC 720 may include verification means 580, which are adapted to verify the authenticity of a date and time-stamp affixed to such digital data files.

Figure 8:
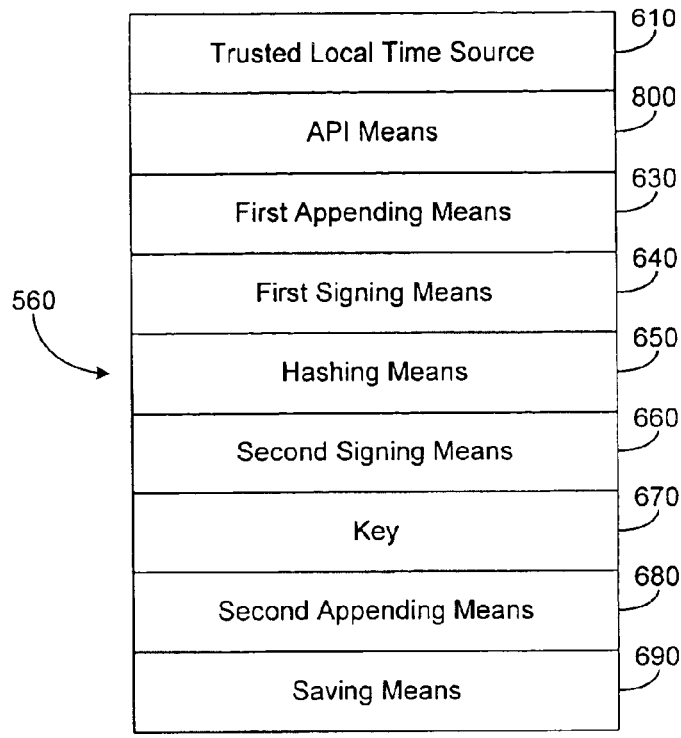
FIG. 8 illustrates in greater detail a presently preferred embodiment of the fraud prevention means according to the invention.

In the alternative, and referring now to FIG. 8, a block diagram of an especially preferred embodiment of the fraud prevention means 560 is shown. Such fraud prevention means 560 generally comprises a trusted local time source 610; application programming interface (API) means 800 for selectively retrieving from local time source 610 a date and a time corresponding to the moment in time that the digital data file was accessed, created, modified, received, saved, or transmitted; means 630 for appending the date and the time retrieved from the trusted time source 610 to the digital data file; and means 690 for saving the digital data file with the date and the time retrieved from the trusted time source 610 appended thereto. In this manner, the fraud prevention means 560 according to this presently preferred embodiment of the invention avoids the necessity of signing, hashing, producing a digest, producing a certificate, and appending that certificate to the digital data file as shown in the embodiment of FIG. 6. However, in the event that the user of such fraud prevention means 560 desires to include such enhanced level of security, the fraud prevention means may further comprise means 640 for signing the saved digital data file with the date and the time retrieved from the trusted time source 610 appended thereto; means 650 for hashing the signed digital data file to produce a digest; means 660 for signing the digest with a key 670 to produce a certificate; and means 680 for appending the certificate to the digital data file.

Where the fraud prevention means 560 includes a tamper-proof real time clock (RTC) on the motherboard or base-board as described in the aforementioned U.S. Ser. No. 09/429,360, the API means 800 is adapted to retrieve from such RTC a date and a time corresponding to the moment in time that the digital data file was accessed, created, modified, received, saved, or transmitted. With other embodiments, such as where the tamperproof RTC is installed on an expansion card, PC card, or smart card as described in the aforementioned U.S. Ser. No. 09/421,279, however, API means 800 is otherwise adapted. In these instances, API means 800 is adapted to sense calls for a timestamp from operating system and/or applications running on the computing means. Thereafter, it uses the date and time from the trusted local time source 610 instead of any date and time of the computing means system clock.

Figure 9:
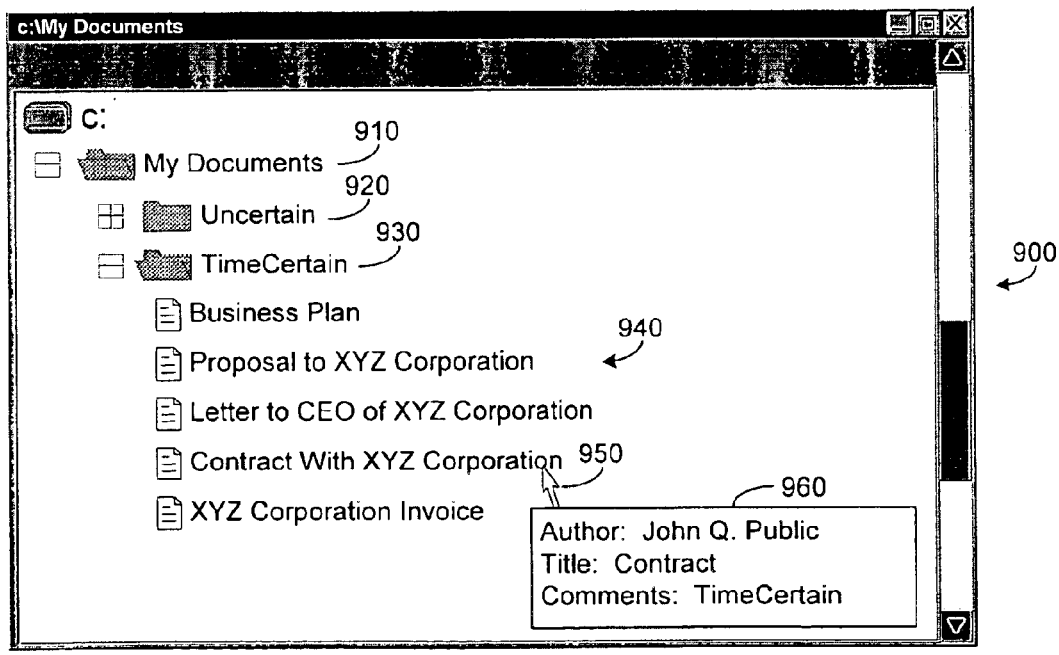
FIG. 9 shows a window illustrating one method of verifying that a digital data file has been time certified by the system according to the present invention.
Figure 10:
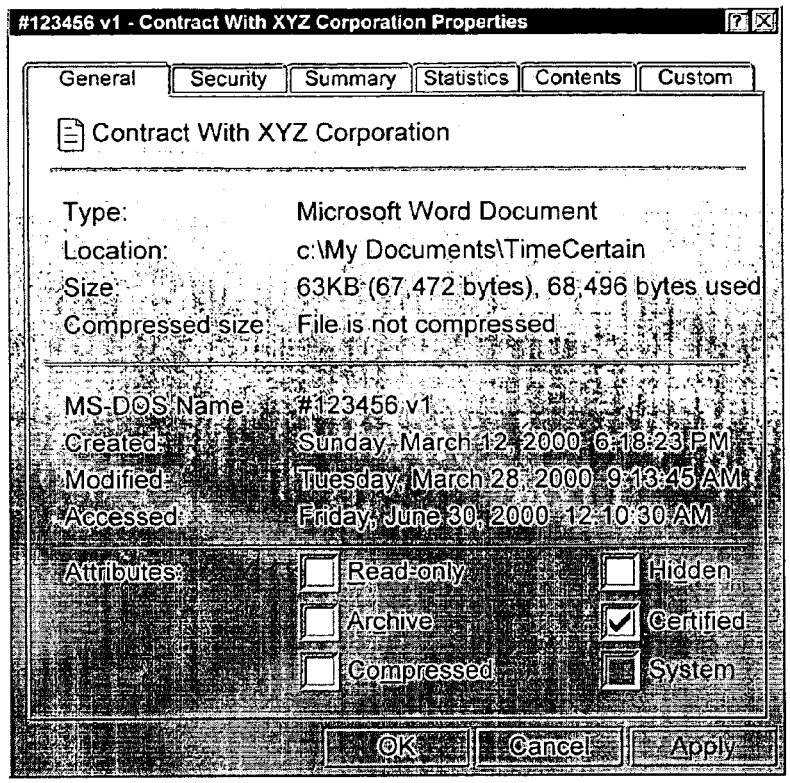
FIG. 10 depicts another window showing a second method of verifying that a digital data file has been time certified by the system according to the present invention.
Figure 11:
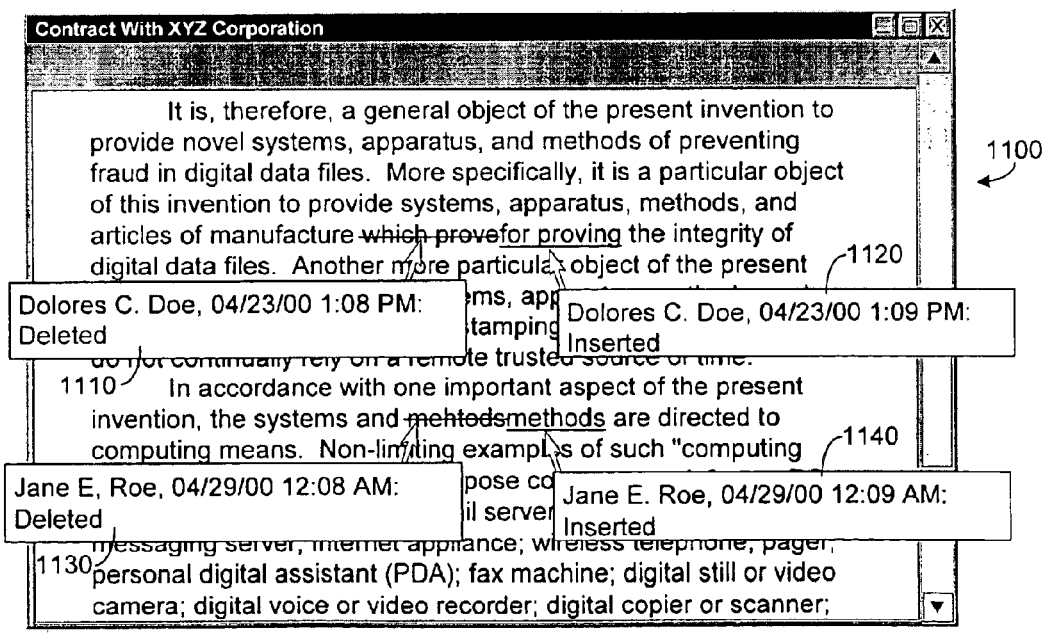
FIG. 11 illustrates yet another window depicting a third method of verifying that a digital data file has been time certified by the system according to the present invention.

The advantages of the system according to the present invention may be further appreciated by reference to FIGS. 9–13. As shown in FIG. 9, a first window 900 displays a directory tree which contains the folder "My Documents" 910 and subfolders 920, 930. A plurality of time-certified documents 940 are contained within the subfolder named "TimeCertain" 930. By pointing the cursor 950 at a selected file, a pop-up box 960 is shown, indicating the name of the author of the document, its title, and comments (e.g., the fact that the document has been time-certified as noted by the word "TimeCertain"). Moreover, instead of merely pointing to a selected file as shown in it FIG. 9, the properties of that file may be displayed by right-clicking the file name to yield a second window as shown in FIG. 10. Not only does the window shown in FIG. 10 indicate that the selected file has been time-certified, but it also indicates the trusted time and date that the selected file was created, modified, or accessed. Portions of the actual text of the selected file can also be displayed in the manner shown in FIG. 11. A window 1100 containing, for example, a Microsoft Word document, is shown with changes tracked and highlighted in a conventional manner. Deletion of the words "which prove" are indicated as having been made by a first user (i.e., Dolores C. Doe) as noted in a first pop-up box 1110, while insertion of the words "for proving" are indicated as having been inserted by that same user as noted in a second pop-up box 1120. Multiple users are, likewise, supported by the system and methods according to the present invention. For example, a correction of the misspelling of the word "meh-tods" is indicated as having been made by a second user (i.e., Jane E. Roe) as noted in a third pop-up box 1130, while the correct spelling "methods" is indicated as having been inserted by that same user as noted in a fourth pop-up box 1140.

Figures 12A, 12B, 12C:
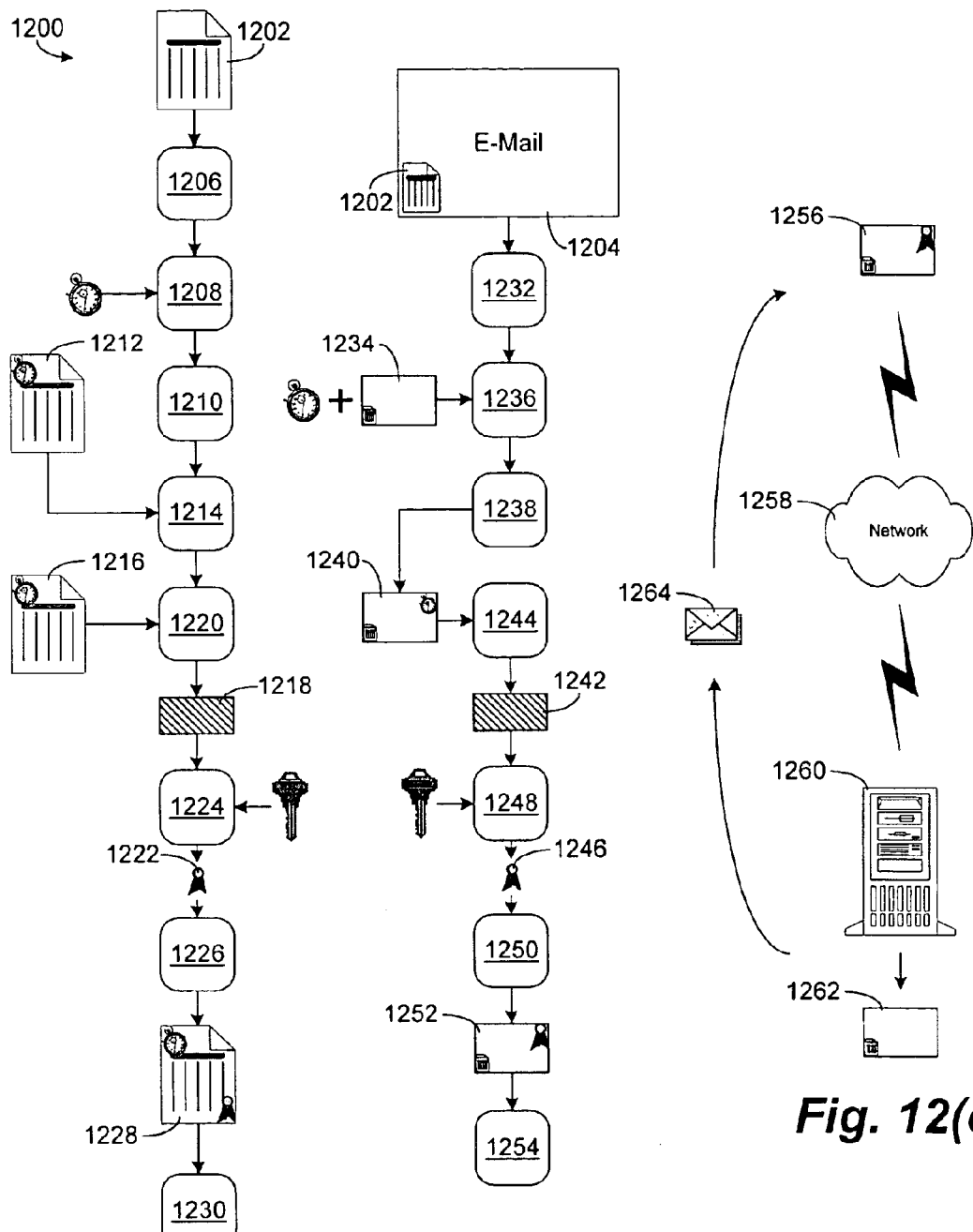
FIGS. 12(a), 12(b), and 12(c) illustrate alternative methods of proving the dates and times of a digital data file according to one embodiment of the present invention.

Referring now to FIG. 12(*a*), a presently preferred method of certifying the times and dates of a digital data file with the system described herein will now be explained. The method 1200 involves two separate digital data files—a document 1202 (ie., a word processing document) and an e-mail 1204 to which the document 1202 may be attached for transmission to a remote recipient. First, the document 1202 itself may be certified in the manner described herein before. That is: (1) a trusted time source would be provided such that the document 1202 would be saved at a given moment in time at step 1206; (2) a date and a time corresponding to the moment in time would be retrieved from the trusted time source at step 1208; (3) then, the time retrieved from the trusted time source would be appended to the saved file at step 1210; (4) the saved file with the date and the time retrieved from the trusted time source appended thereto 1212 would be signed at step 1214; (5) the signed file 1216 would then be hashed to produce a digest 1218 at step 1220; (6) the digest 1218 next would be signed with a key to produce a certificate 1222 at step 1224; (7) the certificate 1222 then would be appended to the signed and saved file 1216 at step 1226; and finally (8) the file with the certificate appended thereto 1228 would be saved at step 1230.

Alternatively, and referring now also to FIG. 12(*b*), an uncertified document 1202 could be simply attached to the e-mail 1204. Before sending the e-mail 1204 with the uncertified document 1202 attached thereto, a user could prompt the system to: (1) retrieve, from the trusted time source, a date and a time corresponding to the moment in time that the "send" button is pushed at step 1232; (2) then, the time retrieved from the trusted time source would be appended to the e-mail and document combination 1234 at step 1236; (3) such a combination 1234 with the date and the time retrieved from the trusted time source appended thereto could be signed at step 1238; (4) the signed combination 1240 could then be hashed to produce a digest 1242 at step 1244; (5) the digest 1242 could be signed with a key to produce a certificate 1246 at step 1248; (6) the certificate 1246 could be appended to the signed and saved combination 1240 at step 1250; and (7) the resulting combination with certificate appended thereto 1252 could finally be sent at step 1254.

As an even further alternative, both the document 1202 and the e-mail 1204 could be time-certified in the foregoing manner. Not only would the document 1202 itself have a time-certified time-stamp affixed to prove the time and date of its access, creation, modification, or transmission, but also the e-mail 1204 transmitting such time-certified document 1202 would be time-certified. The importance of the foregoing methods is underscored by past and current efforts in the Internet community in regards to time-stamping.

For example, standard protocol RFC 778 DCNET Internet Clock Service (April 1981), was intended primarily for two purposes—clock synchronization and one-way delay measurements with cooperating Internet hosts. It uses the Timestamp and Timestamp Reply messages of the Internet Control Message Protocol (ICMP).

The Internet Clock Service was provided using either ICMP or GGP datagrams. The only difference between those datagrams is that ICMP uses protocol number 1 and GGP uses protocol number 3. Both will be referred to interchangeably as "ICS datagrams" in conjunction with the following description of FIG. 13(a), which shows a standard ICS datagram include an internet header followed by an ICS header.

The originator fills in all three timestamp fields 1302, 1304, 1306 just before the datagram 1300 is forwarded to the Internet. Each of these fields contain the local time at origination. Although the last two are redundant, they allow roundtrip delay measurements to be made using remote hosts without time-stamping facilities. The "Type" field 1302 can be either 8 (GGP Echo) or 13 (ICMP Timestamp). The "Code" field 1304 should be zero. The "Sequence" field 1306 can contain either zero or an optional sequence number provided by the user. The length of the datagram 1300 is, thus, 36 octets inclusive of the 20-octet internet header and exclusive of the local-network leader.

The host or gateway receiving ICS datagram 1300 fills in the "Receive Timestamp" field 1308 just as the datagram 1300 is received from the net, and the "Transmit Timestamp" 1310 just as it is forwarded back to the sender. It also sets the "Type" field 1302 to 0 (GGP Echo Reply), if the original value was 8, or 14 (ICMP Timestamp Reply), if it was 13. The remaining fields 1304, 1306 are unchanged.

Figure 13A:
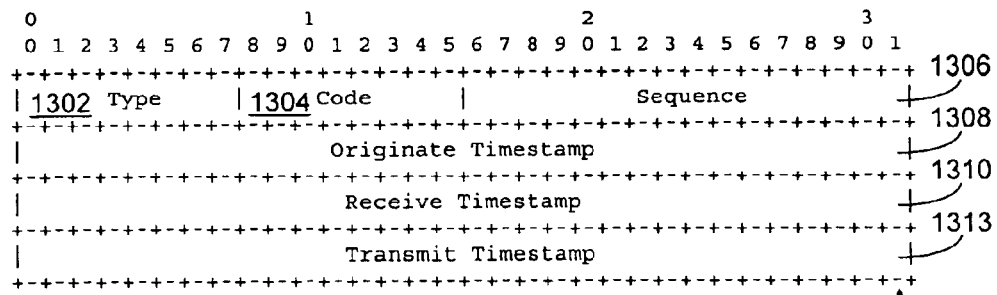
FIGS. 13(a) through 13(d) show datagrams of other time-stamping protocols, which may be used in conjunction with the methods illustrated by FIGS. 9–11.
Figure 13B:
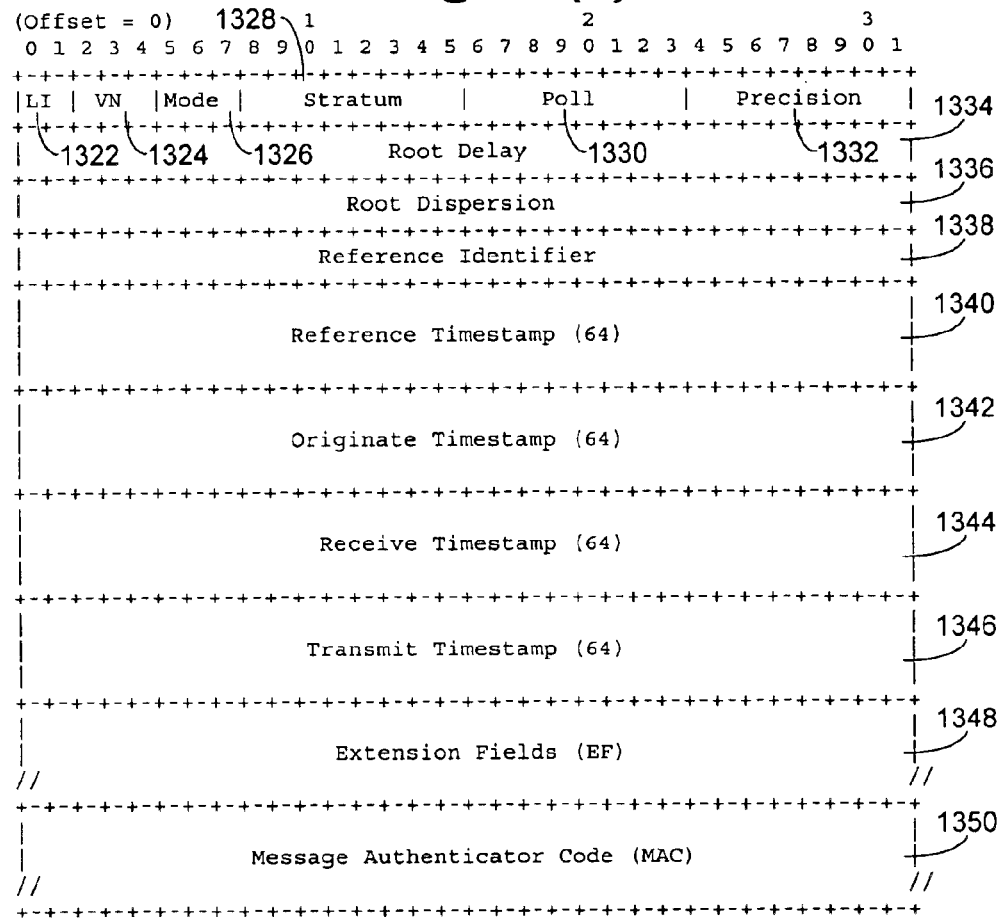
Figure 13C:
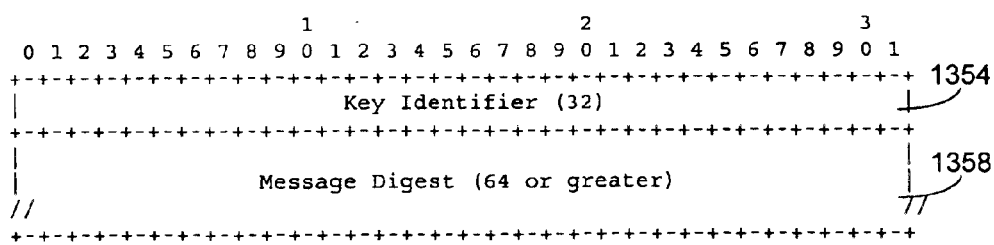
Figure 13D:
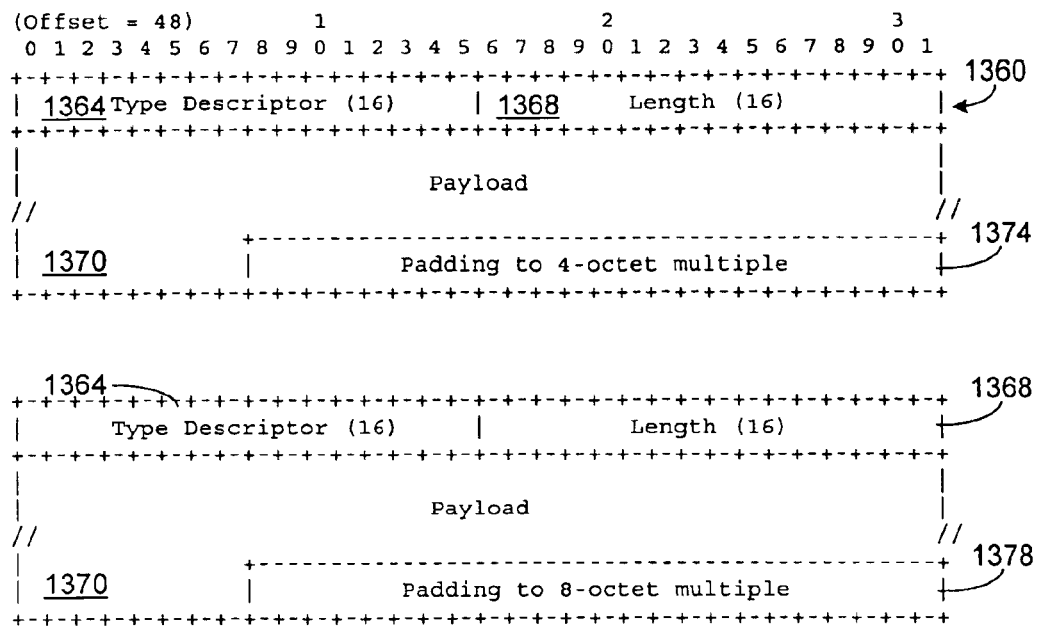

The timestamp values are in milliseconds from midnight UT and are stored right-justified in the 32-bit fields shown in FIG. 13(a). Ordinarily, all time calculations are performed modulo-24 hours in milliseconds. This provides a convenient match to those operating systems which maintain a system clock in ticks past midnight. The specified timestamp unit of milliseconds is consistent with the accuracy of existing radio clocks and the errors expected in the time-stamping process itself.

Delay measurements are made with any DCNET host by simply sending the ICS datagram 1300 to it and processing the reply. For example, t1, t2 and t3 represent the three timestamp fields of the reply in order and t4 the time of arrival at the original sender. Then the delays, exclusive of internal processing within the DCNET host, are simply (t2−t1) to the DCNET host, (t4−t3) for the return and (t2−t1)+(t4−t3) for the roundtrip. In the case of the roundtrip, the clock offsets between the sending host and DCNET host cancel.

Hosts on the Internet that choose to implement a Time Protocol are also expected to adopt and implement the standard protocol RFC 868 Time Protocol (May 1983). This protocol provides a site-independent, machine-readable date and time. A time service sends back to the originating source the time in seconds since midnight on Jan. first 1900. The protocol may be used either above the Transmission Control Protocol (TCP) or above the User Datagram Protocol (UDP).

When used via TCP, the time service works as follows:

| Server | Listen on port 37 (45 octal) |
| User | Connect to port 37 |
| Server | Send the time as a 32 bit binary number |
| User | Receive the time |
| User | Close the connection |
| Server | Close the connection |

Thus, the server listens for a connection on port 37. When the connection is established, the server returns a 32-bit time value and closes the connection. If the server is unable to determine the time at its site, it should either refuse the connection or close it without sending anything.

| Server | Listen on port 37 (45 octal) |
| User | Send an empty datagram to port 37 |
| Server | Receive the empty datagram |
| Server | Send a datagram containing the time as a 32 bit binary number |
| Server | Receive the time datagram |

The server listens for a datagram on port 37. When a datagram arrives, the server returns a datagram containing the 32-bit time value. If the server is unable to determine the time at its site, it should discard the arriving datagram and make no reply.

Several Internet Drafts also provides means for time-stamping. One of those is entitled "Authentication Scheme Extensions to NTP", Mills, David L., T. S. Glassey, and Michael E. McNeil, March 1999. The purpose of that draft is to extend the NTP/SNTP authentication scheme to support additional features, including Public Key Infrastructure (PKI) cryptography, in order to certify the identity of the sender and verify the integrity of the data included in an NTP message, as are well as provide support for other facilities such as a timestamp and non-repudiation service.

The draft describes a new extension field to support the new services. One or more of these fields can be included in the NTP header to support designated security services or other services should they become necessary. However, the presence of these fields does not affect the operation of the NTP timekeeping model and protocol in any other way. In order to preserve existing interoperability, the presence of these fields is determined by the message length. Ordinary (unprotected) NTP messages are 48 octets long. Protected messages include either a 13-octet or 20-octet Message Authentication Code (MAC), depending on the hash algorithm, presently either Data Encryption Standard/ Cipher-Block Chaining (DES-CBC) or Message Digest 5 (MD5). The extension fields are inserted after the unprotected header and before the MAC. If the overall length of the NTP message is greater than the sum of the protected header length and the longest MAC length, one or more extension fields are present.

Following traditional formats used by Internet protocols, the NTP message consists of some number of 4-octet words in big-endian format. The first word contains the total length of the extension field in the low-order two octets. The high-order two octets contain a type code to identify the payload content and processing algorithm. In order to preserve alignment appropriate for block-encryption algorithms such as DES, the last extension field is zero-padded to the next larger integral multiple of eight octets. The hashing algorithm processes the extension fields along with the protected header to produce the MAC at the end of the message. Other than hash processing, the extension fields are invisible to the ordinary NTP protocol operations. The payload may include cryptographic media to support any of several cryptographic schemes, including the Autokey scheme of NTP Version 4 and other schemes as they are developed. The data can include various subfields containing sequence numbers, additional message digests, signatures and certificates, as well as the length of these subfields. Additional fields may provide means to securely bind arbitrary client data to be signed along with the other information in the message. The ability to sign arbitrary client data provides an important non-repudiation feature that allows this data to be cryptographically bound to an NTP timestamp, together with sender credentials and signature.

With respect to the unprotected NTP header described in RFC 1305 and RFC 2030, the NTP header according to the draft noted above has the format 1320 shown in FIG. 13(b).

The 48-octet fixed-length unprotected header includes all fields 1322, 1324, 1326, 1328, 1330, 1332, 1334, 1336, 1338, 1340, 1342, 1344 through the Transmit Timestamp field 1346. The MAC 1350 includes a 4-octet Key Identifier field 1354 followed by a variable length Message Digest field 1358 in the format shown in FIG. 13(*c*).

The Message Digest field 1358 length can be either 8 octets for DES-CBC or 16 octets for MD5. SHA-1 uses a 20-octet message digest. Selection of which one of the former two supported algorithms, or more in the case of additional hash algorithms, is determined from the Key Identifier field 1354 as described in greater detail herein below.

The original NTP Version 3 authentication scheme described in RFC 1305 uses a hashing algorithm (DES-CBC or MD5) to produce a cryptographic checksum of the unprotected NTP header. This checksum is computed by the sender and included along with a private key identifier in the MAC 1350. The receiver verifies the checksum using its own copy of the private key. The extended scheme proposed for NTP Version 4, uses the extension field described in the draft noted above, and continues support for the previous scheme and is compatible with the scheme proposed therein.

In both NTP versions a designated hashing algorithm is used to compute the message digest. While only DES-CBC and MD5 algorithms are supported in existing implementations, other algorithms may be supported in future. Each algorithm may require a specific message digest field length, but not less than 8 octets, nor more than 20 octets. For instance, DES requires an 8-octet field, and MD5 requires a 16-octet field, whereas the SHA-1 algorithm, which may be supported in the future, requires a 20-octet field. Any of these algorithms hashes the contents of the 48-octet unprotected header and variable length extension fields, but not the IP addresses, ports or MAC 1350 itself, to produce the message digest 1358.

In the NTP Version 3 scheme, the key identifier 1354 is used to select a private encryption/decryption key from a predistributed set of keys. Associated with each key is an algorithm identifier, which is defined when the key is created and remains with it for the lifetime of the key. The key identifier is used to look up the key and associated algorithm identifier. Thus, no specific algorithm identifier field is necessary in the MAC 1350. In the NTP Version 4 schema, this model is preserved; however, there is a new scheme, called Autokey, which does not require prior distribution of keys. In order to preserve legacy, the key identifier space is partitioned in two subspaces, one allocated for private keys, the other for randomly generated Autokey keys. This distinction is necessary only to clarify how the hashing algorithm is identified and by implication how the length of the MAC 1350 can be determined.

Zero, one or more extension fields 1348 can be included between the unprotected header and the MAC 1350. Each extension field 1348 (as shown in greater detail in FIG. 13(*d*)) consists of a 4-octet header 1360 and variable length payload 1370. The first two octets of the header (reading as in big-endian order) contain the type descriptor 1364. The next two octets contain the total extension field length 1368, including the length and type octets, but not any padding at the end. Each extension field 1348 is zero-padded, as necessary, to the next 4-octet alignment; the last field is zero-padded to the next 8-octet alignment. The total length of every extension field 1348 must be greater than 24 octets, in order to reliably recognize its presence. This value, added to the offset of the extension field 1348 within the message, points to the first octet following the extension field 1348.

The overall format of all extension fields within a given NTP packet is as follows.

The type descriptor 1364 identifies the algorithm that understands the particular format of a given type of extension field 1348. There may be a mixture of ASN.1, binary, ASCII and printable data in each field, depending on the algorithm involved. There is no specific requirement on ordering, if more than one extension field 1348 is present. In general, schemes that require multiple fields will have to scan through all type descriptors 1364 to verify that all required fields are present and to determine the sequence of processing steps.

Some fields, such as certificate and signature fields, may be considered generic across several different schemes, while others may be specific to each scheme. For instance, most schemes using PKI will use X.509 certificates, RSA signatures, and Diffie-Hellman key agreement, if any of these features are required. In order to support these schemes, the following functional types are supported.

A "null field is ignored, except by the hashing algorithm. It is included for testing and debugging. A "certificate" field contains the X.509 certificate in ASN.1 format. A "generic signature" field contains the RSA signature in PKCS-1 encrypted block format. For this purpose, the RSA modulus and public exponent must be derived from the certificate or known by other means. The data to be signed is the message digest 1358 (FIG. 13(*c*)) included in the MAC 1350 at the end of the NTP message. It should be noted, however, that this does not preclude a proprietary signature scheme with different semantics.

An "Autokey" field contains any Autokey data. A "scheme" field is scheme-specific. That is, it contains such variables as version ID, source ID, serial number, request/response bits and so forth. There may be more than one scheme field if more than one scheme is operating simultaneously. This could occur, for example, if the NTP Version 4 Autokey scheme is in use along with time-stamping service or non-repudiation service. There may be data in an extension field 1348 that is known only after the message digest 1350 has been computed (e.g., the signature). In order to produce a deterministic result, it is necessary to temporarily replace these data with zeros when the digest is computed and replace them when the final result is known. This is the same action specified in IPSEC documents.

The various fields in the NTP message are parsed in the following manner. The parsing algorithm assumes a pointer initially positioned at the end of the unprotected header (i.e., at offset 48 octets). At each step the remaining payload 1370 from the pointer to the end of the message is considered.

If the remaining payload length is zero (i.e., the pointer is at the end of the message), then there is no NTP MAC and the NTP authentication scheme described above is not used. If, on the other hand, extension fields 1348 have been found previously, they are processed at this time and may result in message authentication by other schemes.

If the remaining payload length is less than four octets, a format error will be declared and the message should be considered to be unauthenticated. If the remaining payload length is not greater than 24 octets, the NTP authentication scheme is in use, perhaps along with any previously located extension fields 1348. The first 4-octet word in the remaining payload 1370 contains the key identifier 1354 used to look up the key and algorithm identifier. Depending on the particular algorithm identifier, the expected MAC length is checked against the actual remaining length. If the lengths agree, the message is processed as described above. If not, a format error will be declared and the message should be considered to be unauthenticated. Following processing of the MAC 1350, any extension fields 1348 are processed. This may involve separately signing or encrypting the message digest 1358 located in the MAC 1350.

The remaining payload length must be greater than 24 octets. An extension field 1348 will be present. If an extension field 1348 was found prior to this one in the NTP message, and the earlier extension field 1348 was padded to a 4-octet alignment rather than 8, the pointer must be backtracked by 4 octets. The pointer may then be moved over the next extension field 1348 by adding the contents of its 2-octet length word to the current pointer value. The, the pointer will be rounded up to the next 8-octet alignment.

Another relevant Internet Draft is entitled "Internet X.509 Public Key Infrastructure Time Stamp Protocol (TSP), Adams, C., P. Cain, D. Pinkas, and R. Zuccherato, October 1999 ("<draft-ietf-pkix-time-stamp-04.txt>"). This draft allows a time stamping service to prove that a datum existed before a particular time and can be used as a Trusted Third Party (TTP).

In order to associate a datum with a particular point in time, a Time Stamp Authority (TSA) may need to be used. This Trusted Third Party provides a "proof-of-existence" for this particular datum at an instant in time.

The TSA's role is to time stamp a datum to establish evidence indicating the time at which the datum existed. This can then be used, for example, to verify that a digital signature was applied to a message before the corresponding certificate was revoked, thus allowing a revoked public key certificate to be used for verifying signatures created prior to the time of revocation. This can be an important public key infrastructure operation. The TSA can also be used to indicate the time of submission when a deadline is critical, or to indicate the time of transaction for entries in a log. An exhaustive list of possible uses of a TSA is beyond the scope of this document.

The TSA is a ITP that creates time stamp tokens in order to indicate that a datum existed at a particular point in time. TSAs are required: (1) to provide a trustworthy source of time; (2) not to include any identification of the requesting entity in the time stamp tokens; (3) to include a monotonically incrementing value of the time for each newly generated time stamp token; (4) to include a monotonically incrementing integer for each newly generated time stamp token; (5) to produce a time stamp token upon receiving a valid request from the requester, when it is possible; (6) to include within each time stamp token an identifier to uniquely indicate the security policy under which the token was created; (7) to only time stamp a hash representation of the datum, i.e. a data imprint associated with a one-way collision resistant hash-function OID; (8) to examine the OID of the one-way collision resistant hash-function and to verify that the hashvalue length is consistent with the hash algorithm; (9) not to examine the imprint being time stamped in any way; (10) to sign each time stamp token using a key generated exclusively for this purpose and have this property of the key indicated on the corresponding certificate; and (11) to include additional information in the time stamp token, if asked by the requester using the extensions field, only for the extensions that are supported by the TSA. If this is not possible, the TSA shall respond with an error message.

As the first message of this mechanism; the requesting entity requests a time stamp token by sending a request (which is or includes a TimeStampReq, as defined below) to the Time Stamping Authority. As the second message, the Time Stamping Authority responds by sending a response (which is or includes a TimeStampToken, as defined below) to the requesting entity.

Upon receiving the response (which is or includes a TimeStampResp, as defined below), the requesting entity verifies the status error returned in the response and if no error is present verifies the various fields contained in the TimeStampToken and the validity of the digital signature of the TimeStampToken. In particular, it verifies that what was time stamped corresponds to what was requested to be time stamped. The requester then must verify that the TimeStampToken contains the correct certificate identifier of the TSA, the correct data imprint and the correct hash algorithm OID. It must then verify the timeliness of the response by verifying either the time included in the response against a local trusted time reference, if one is available, and/or the value of the "once" (a large random number with a high probability that it is generated by the client only once) included in the response against the value included in the request. Since the TSAs certificate may have been revoked, the status of the certificate should then be checked (e.g., by checking the appropriate CRL) to verify that the certificate is still valid.

The client application should then check the policy field to determine whether or not the policy under which the token was issued is acceptable for the application. The client may ignore this field if that is acceptable for the intended application. The TSA must sign all time stamp messages with one or more keys reserved specifically for that purpose. The corresponding certificate must contain only one instance of the extended key usage field extension as defined in RFC 2459, Section 4.2.1.13 with KeyPurposeID having value id-kp-timeStamping.

A TSAs certificate may contain an Authority Information Access extension (as defined in RFC 2459) in order to convey the method of contacting the TSA. The access-Method field in this extension must contain the OID id-ad-time-stamping:

```
id-ad                 OBJECT IDENTIFIER : := { id-pkix 48 }
id-ad-time-stamping   OBJECT IDENTIFIER : := { id-ad X }
```

The value of the accessLocation field defines the transport (e.g., HTTP) used to access the TSA and may contain other transport dependent information (e.g., a URL).

A time stamping request is as follows:

```
TimestampReq : := SEQUENCE {
    version            Integer { vl(l) },
    messageImprint     MessageImprint,
        - -a hash algorithm OID aad the hash value of the data to be
        - -time stamped
    reqPolicy          [0] PolicyInformation    OPTIONAL,
    nonce              [1] Integer              OPTIONAL,
    extensions         [2] EXPLICIT Extensions  OPTIONAL
}
```

The version field describes the version of the TimeStamp request.

The messageImprint field must contain the hash of the datum to be time stamped. The hash is represented as an OCTET STRING. Its length must match the length of the hash value for that algorithm (e.g., 20 bytes for SHA-1 or 16 bytes for MD5).

```
MessageImprint : := SEQUENCE {
    hashAlgorithm      AlgorithmIdentifier,
    hashedMessage      OCTET STRING }
```

The hash algorithm indicated in the hashAlgorithm field must be a known hash algorithm that is both one-way and collision resistant.

The reqPolicy field, if included, indicates the policy under which the TimeStampToken should be provided. PolicyInformation is defined in Section 4.2.1.5 of RFC 2459. The nonce, if a, included, facilitates verification of the timeliness of the response when no local clock is available. The nonce is a large random number with a high probability that it is generated by the client only once (eg.,. a 64 bits integer). In such a case, the same nonce value should be included in the response or the response should be rejected. The extensions field is a generic way to add additional information to the request in the future, and is defined in RFC 2459. If an extension, whether it is marked critical or not critical, is used by a requester but is not recognized by a time stamping server, the server must not issue a token and return a failure (badRequest).

The time stamp request does not identify the requester, as this information is not validated by the TSA. In situations where the TSA requires the identity of the requesting entity, alternate identification/authentication means have to be used (e.g., CMS encapsulation or TLS authentication described in RFC 2246.

A time stamping response is as follows:

```
TimeStampResp : := SEQUENCE {
    status           PKIStatusInfo,
    timeStampToken   TimeStampToken   OPTIONAL
}
```

The status uses the same error codes that are defined in Section 3.2.3 of RFC 2510, but adds two new ones.

When the PKIStatusInfo contains the value zero, a Time Stamp Token will be present. Otherwise, the status indicates the reason why the time stamp request was rejected.

```
PKIFailureInfo : := BITSTRING {
    badAlg              (0),
        - - unrecognized or unsupported Algorithm Identifier
    badRequest          (2),
        - - transaction not permitted or supported
    badDataFormat       (5),
        - - the data submitted has the wrong format
    timeNotAvailable    (14),
        - - the TSAs time source is not available
    addInfoNotAvailable (15)
        - - the additional infomation requested could not be understood
            or is not available
}
```

These are the only values of PKIFailureInfo that are supported. Servers in compliance with this draft must not produce any other values. On the other hand, compliant clients may ignore any other tin values.

The statusString field of PKIStatusInfo may be used to include reason text such as messageImprint field is not correctly formatted.

If the error code returned is different from zero, then the TimeStampToken is not returned.

A TimeStampToken appears as follows. It is encapsulated as a SignedData construct in the EncapsulatedContentInfo field.

```
SignedData : := SEQUENCE {
    version             CMSVersion,
    digestAlgorithm     DigestAlgorithmIdentifiers,
    encapContentInfo    EncapsulatedContentInfo,
    certificates        [0] IMPLICIT CertificateSet OPTIONAL,
    crls                [1] IMPLICIT
                            CertificateRevocatiomLists OPTIONAL,
    signerInfos         SignerInfos }
SignerInfos : := SET OF SignerInfo
EncapsulatedContentInfo : := SEQENCE {
    eContentType        ContentType,
    eContent            [0] EXPLICIT OCTET STRING OPTIONAL }
ContentType : := OBJECT IDENTIFIER
```

The above fields of type EncapsulatedContentInfo have the following meanings. eContentType is an object identifier that uniquely specifies the content type. For a time stamping token, it is defined as:

```
id-ct-TSTInfo    OBJECT IDENTIFIER : := {id-ct 4}
with:
id-ct            OBJECT IDENTIFIER : := { id-smime 1 }
id-smime         OBJECT IDENTIFIER : := { iso(1) member-body(2)
                     us(840) rsadsi(113549) pkcs(1) pkcs-9(9) 16 }
``` eContent is the content itself, carried as an octet string. The econtent content type has ASN.1 type TSTInfo.

The time stamp token must not contain any signatures other than the signature of the TSA. The certificate identifier of the TSA certificate shall be included as a signed attribute.

```
TSTInfo : := SEQUENCE {
    version          Integer { v1(l) },
    policy           PolicyInformation,
    messageImprint   MessageImprint,
        - - MUST have the same value as the similar field in
        - - TimeStampReq
    serialNumber     Integer,
    genTime          GeneralizedTime,
    accuracy         [0] Accuracy                    OPTIONAL,
    nonce            [1] Integer                     OPTIONAL,
        - - MUST be present if the similar field was present
        - - in TimeStampReq. In that case it must have the same value.
    tsa              [2] GeneralName                 OPTIONAL,
    extensions       [3] EXPLICIT Extensions         OPTIONAL
}
```

The version field describes the version of the Timestamp token.

Timestamping servers in conformance with this draft must be able to provide version 1 Timestamp tokens. Among the optional fields, only the nonce field needs to be supported, if the similar field is present in TimeStampReq. Conforming time-stamping requesters must be able to recognize version 1 Timestamp tokens with all the optional fields present, but are not mandated to understand the semantics of any extension, if present.

The policy field must indicate the TSAs policy under which the response was produced. If a similar field was present in the TimeStampReq, then it must have the same value, otherwise an error (badRequest) must be returned. This policy may include the following types of information, although this list is certainly not exhaustive.

1. The conditions under which the time-stamp may be used
2. The availability of a time-stamp log, to allow later verification that a time-stamp token is authentic.

The messageImprint must have the same value as the similar field in TimeStampReq, provided that the size of the hash value matches the expected size of the hash algorithm identified in hashalgorithm. The serialNumber field shall include a strictly monotonically increasing integer from one TimeStampToken to the next (e.g., 45, 236, 245, 1023, . . . ). This guarantees that each A token is unique and allows to compare the ordering of two time stamps from the same TSA. This is useful in particular when two time-stamps from the same TSA bear the same time. This field also provides the way to build a unique identifier to reference the token. It should be noted that the monotonic property must remain valid even after a possible interruption (e.g., crash) of the service.

genTime is the time at which the timestamp has been created by the TSA. The ASN.1 GeneralizedTime syntax can include fraction-of-second details. Such syntax, without the restrictions from Section 4.1.2.5.2 of RFC 2459, where GeneralizedTime is limited to represent time with one second, may to be used here. However, when there is no need to have a precision better than the second, then GeneralizedTime with a precision limited to one second should be used as in RFC 2459.

The syntax is: YYYYMMDDhhmmss[.s .. ]Z

Example: 19990609001326.34352Z

X.690|ISO/IEC 8825-1 provides the restrictions for a DER-encoding.

The encoding terminates with a "Z". The decimal point element, if present, is the point option ".". The fractional-seconds elements, if present, shall omit all trailing 0's. If the elements correspond to 0, they shall be wholly omitted, and the decimal point element also is omitted. Midnight (GMT) is represented in the form: "YYYYMMDD000000Z" where "YYYYDD" represents the day following the midnight in question:

Here are a few examples of valid representations:
"19920521000000Z"
"19920622123421Z"
"19920722132100.3Z"

Accuracy represents the time deviation around the UTC time contained in GeneralizedTime.

```
Accuracy ::= CHOICE {
            seconds   [1] INTEGER,
            millis    [2] INTEGER    (1..999),
            micros    [3] INTEGER    (1..999)
}
```

By adding the accuracy value to the GeneralizedTime, an upper limit of the time at which the time-stamp has been created by the TSA can be obtained. In the same way, by subtracting the accuracy to the GeneralizedTime, a lower limit of the time at which the timestamp has been created by the TSA can be obtained. Accuracy is expressed as an integer, either in seconds, milliseconds (between 1–999) or microseconds (1–999). When the accuracy field, which is optional, is missing, then, by default, an accuracy of one second is meant.

The nonce field must be present if it was present in the TimeStampReq.

The purpose of the tsa field is to give a hint in identifying the name of the TSA. If present, it must correspond to one of the subject names included in the certificate that is to be used to verify the token. However, the actual identification of the entity which signed the response will always occur through the use of the certificate identifier (ESSCertID Attribute) which is part of the signerInfo As noted herein above, extensions is a generic way to add additional information in the future. Extensions are defined in RFC 2459. However, version 1 only supports non-critical extensions. This means that conforming requesters are not mandated to understand the semantics of any extension. Particular extension field types may be specified in standards or may be defined and registered by any organization or community.

There is no mandatory transport mechanism for TSA messages in this draft. All of the mechanisms described herein below are optional.

A file containing a time-stamp message must contain only the DER encoding of one TSA message (i.e., there must be no extraneous header or trailer information in the file). Such files can be used to transport time stamp messages using for example, FTP.

The following simple TCP-based protocol is to be used for transport of TSA messages. This protocol is suitable for cases where an entity initiates a transaction and can poll to pick up the results. It basically assumes a listener process on a TSA which can accept TSA messages on a well-defined port (IP port number 318).

Typically an initiator binds to this port and submits the initial TSA message. The responder replies with a TSA message and/or with a reference number to be used later when polling for the actual TSA message response. If a number of TSA response messages are to be produced for a given request (e.g., if a receipt must be sent before the actual token can be produced), then a new polling reference is also returned. When the final TSA response message has been picked up by the initiator then no new polling reference is supplied.

The initiator of a transaction sends a "direct TCP-based TSA message" to the recipient. The recipient responds with a similar message. A "direct TCP-based TSA message" consists of:

length (32-bits), flag (8-bits), value (defined below)

The length field contains the number of octets of the remainder of the message (i.e., number of octets of "value" plus one). All 32-bit values in this protocol are specified to be in network byte order.

```
Message name   flag    value
tsaMsg         '00'H   DER-encoded TSA message
    - - TSA message
pollRep        '01'H   polling reference (32 bits),
                       time-to-check-back (32 bits)
    - - poll response where no TSA message response ready; use
    - - polling reference value (and estimated time value) for later
    - - polling
pollReq        '02'H   polling reference (32 bits)
    - - request for a TSA message response to initial message
negPollRep     '03'H   '00'H
    - - no further polling responses (i.e., transaction complete)
partialMsgRep  '04'H   next polling reference (32 bits),
                       time-to-check-back (32 bits),
                       DER-encoded TSA message
    - - partial response (receipt) to initial message plus new polling
    - - reference (and estimated time value) to use to get next
    - - part of response
finalMsgRep    '05'H   DER-encoded TSA message
    - - final (and possibly sole) response to initial message
errorMsgRep    '06'N   human readable error message
    - - produced when an error is detected (e.g., a polling reference
    - - is received which doesn't exist or is finished with)
```

The sequence of messages which can occur is: (a) entity sends tsaMsg and receives one of pollRep, negPollRep, partiallMsgRep or finalMsgRep in response; (b) end entity sends pollReq message and receives one of negPollRep, partialMsgRep, finalMsgRep or errorMsgRep in response. The "time-to-check-back" parameter is a 32-bit integer, defined to be the number of seconds which have elapsed since midnight, Jan. 1, 1970, coordinated universal time. It provides an estimate of the time that the end entity should send its next pollReq.

The following specifies a means for conveying ASN.1-encoded messages for the protocol exchanges via Internet mail. A simple MIME object is specified as follows:

Content-Type: application/timeatamp
Content-Transfer-Encoding: base64
<<the ASN.1 DER-encoded Time Stamp message, base64-encoded>>

This MIME object can be sent and received using common MIME processing engines and provides a simple Internet mail transport for Time Stamp messages.

One means for conveying ASN. 1-encoded messages for the protocol exchanges via the HyperText Transfer Protocol is described below. In this case, a simple MIME object is specified as follows:

Content-Type: application/timestamp <<the ASN.1 DER-encoded Time Stamp message>>

This MIME object can be sent and received using common HTTP processing engines over WWW links and provides a simple browser-server transport for Time Stamp messages. Upon receiving a valid request, the server must respond with either a valid response with content type application/timestamp or with an HTTP error.

When designing a TSA service, this draft has identified the following considerations that have an impact upon the validity or "trust" in the time stamp token.

1. When there is a reason to both believe that the TSA can no longer be trusted but the TSA private key has not been compromised, the authority's certificate shall be revoked. Thus, at any future time, the tokens signed with the corresponding key will not considered as valid.

2. When the TSA private key has been compromised, then the corresponding certificate shall be revoked. In this case, any token signed by the TSA using that private key cannot be trusted anymore. For this reason, it is imperative that the TSA's private key be guarded with proper security and controls in order to minimize the possibility of compromise. In case the private key does become compromised, an audit trail of all tokens generated by the TSA may provide a means to discriminate between genuine and false backdated tokens. A double time-stamp for two different TSAs is another way to address this issue.

3. The TSA signing key must be of a sufficient length to allow for a sufficiently long lifetime. Even if this is done, the key will have a finite lifetime. Thus, any token signed by the TSA should be time-stamped again (i.e., if authentic copies of old CRLs are available) or notarized (i.e., if they aren't) at a later date to renew the trust that exists in the TSA's signature. Time stamp tokens could also be kept with an Evidence Recording Authority to maintain this trust.

4. An application using the TSA service should be concerned about the amount of time it is willing to wait for a response. A "man-in-the-middle" attack can introduce delays. Thus, any TimeStampToken that takes more than an acceptable period of time should be considered suspect.

One of the major use of time stamping is to time stamp a digital signature to prove that the digital signature was created before a given time. Should the corresponding public key certificate be revoked, this procedure facilitates the determination of whether the signature was created before or after the revocation date. The following describes one Signature Timestamp attribute that may be used to timestamp a digital signature.

The following object identifier identifies the Signature Timestamp attribute:

id-signatureTimeStampToken OBJECT IDENTIFIER::= {iso(1) member-body(2)
us(840) rsadsi(113549) pkcs(1) pkcs-9(9) amime(16) id-aa(2)<TBD>}

The Signature timestamp attribute value has ASN.1 type SignatureTimeStampToken:

SignatureTimeStampToken::TimeStampToken

The value of messageImprint field within TimeStampToken will be a hash of the value of signature field within Sigrier-Info for the signedData being time-stamped.

The "Internet X.509 Public Key Infrastructure Time Stamp Protocol (TSP)" draft described above also presents an example of a possible use of the foregoing general time stamping service. It places a signature at a particular point in time, from which the appropriate certificate status information (e.g., CRLs) must be checked. This application is intended to be used in conjunction with evidence generated using a digital signature mechanism.

Signatures can only be verified according to a non-repudiation policy. This policy may be implicit or explicit (i.e., indicated in the evidence provided by the signer). The non-repudiation policy can specify, among other things, the time period allowed by a signer to declare the compromise of a signature key used for the generation of digital signatures. Thus, a signature may not be guaranteed to be valid until the termination of this time period.

According to the "Internet X.509 Public Key Infrastructure Time Stamp Protocol (TSP)" draft, the following basic technique may be used to verify a digital signature. First, time-stamping information needs to be obtained as soon as possible after the signature has been produced (e.g., within a few minutes or hours). This may be done by presenting the signature to the TSA. The TSA then returns a TimeStamp-Token (TST) upon that signature. Next, the invoker of the service must verify that the TimeStampToken is correct.

The validity of the digital signature may then be verified as follows. First, the time-stamp itself must be verified. It must also be verified that it applies to the signature of the signer. The date/time indicated by the TSA in the Time Stamping Token must then be retrieved. Then, the certificate used by the signer must be identified and retrieved. The date/time indicated by the TSA must be inside the validity period of the signer's certificate. Next, any revocation information about that certificate, at the date/time of the time-stamping operation, must be retrieved. Should the certificate be revoked, then the date/time of revocation shall be later than the date/time indicated by the TSA. If all the above conditions are successful, then the digital signature shall be declared as valid.

The benefits of the methods shown in FIGS. 12(*a*) and 12(*b*) may be better understood by use of the following example shown in FIG. 12(*c*). Consider, for example, an e-mail having a document embedded therein 1256. Furthermore, consider e-mail 1256 as having been date and time-stamped according to any one of the methods described herein above (e.g., the document is time-stamped as well as the e-mail; the document alone is time-stamped and embedded within the e-mail, the e-mail alone is time-stamped with the document thereafter being embedded within; or the e-mail having a document embedded within is time-stamped as a combination). E-mail 1256, accordingly, has been time-stamped with a trusted time. It is then transmitted across network 1258 to receiving PC 1260. In the event that the receiving PC 1260 also comprises a system 700 as described herein before, the verification of the time-stamp will be straightforward. However, if the receiving PC 1260 includes fit no trusted source of time, the sender of e-mail can not be certain that the receiver read e-mail 1256 at any given trusted time.

In accordance with yet another important aspect of the present invention, a certified e-mail 1256 may be sent with a return receipt requested. As is known, most e-mail software applications include the ability to send a receipt to the sender when the intended receiver has opened an e-mail having been sent with a request for return receipt. A sender of certified e-mail 1256 makes such a request at a trusted time TC1. A relative delay time TD can be determine in conventional ways, as described herein above with reference to FIGS. 13(*a*) through 13(*d*). Accordingly, a PC system 700 of the present invention will add the delay time TD to TC1 to compute a TC2, which is the relative time certain that e-mail 1256 was received at the receiving PC 1260. This does not, however, give the sender a time certain that the receiver opened e-mail 1256. Nevertheless, the local trusted time source 610 (FIG. 6) will be able to maintain an accurate time until the receiver opens e-mail 1256.

The opened e-mail 1262 would trigger creation of a return receipt 1264 in the manners well-known to e-mail software applications developers. This receipt 1264 would contain an uncertified time-stamp UC1 representing the local date and time that the receiver had opened the e-mail 1256. When the PC system 700 of the sender receives that receipt 1264, it calculates another relative time certain TC4, based on the local trusted time certain of its receipt TC3 and delay time TD. That is:

$$TC4=TC3-TD.$$

Moreover, a fifth relative time certain is calculated by PC system 700 to "synchronize" the sender's and the receiver's clock. Actual synchronization does not occur. However, this fifth relative time certain TC5 indicates the differential in the time at the local trusted time source 610 and the time at the remote PC 1260. If the time UC1 as appended to the receipt 1264 is compared to TC4, users of the PC system 700 can readily establish this time differential D as follows:

$$D=TC4-UC1.$$

This differential D may then be used, at least over the short-term, to provide reasonable certainty of 3 on-going communications with the receiving PC 1260.

Variations and modifications of the above described methods and systems according to this invention are possible without departing from the true spirit and scope thereof. For example, fraud prevention means 560 may be initially installed on motherboards or baseboards in the manner described above. Alternatively, they may be retrofitted in existing PCs; or they may be installed on expansion cards of the PCI and ISA types supported by such motherboards and baseboards; or they may be installed in an external device such as a dongle coupled to such PCs.

Such expansion cards and external devices, therefore, would each include an RTC set to the trusted time and having a tamper-evident label attached thereto. In that case, such RTCs on the expansion cards and external devices would be include the API means 800 to selectively bypass any system RTC on the motherboard or baseboard. They would, thus, not interfere with such system RTCs, and would only be used to affix a trusted time-stamp to any or all digital data files in the foregoing manner.

Conventional intrusion alarms of PCs and servers could also be coupled to provide a signal to the fraud prevention means 560. In that case, any activation of the signal, which would indicate an occurrence of an intrusion, would be used to disable operation of the fraud prevention means 560. Fraud prevention means 560 would not only be capable of recognizing other certificates from CAs known in the PKI environment, but they would also be capable of being used in conjunction with any of the above described Internet protocols.

The verification means 580 according to the present invention could, likewise, be coupled within fraud prevention means 560 and provide a simple means for determining that a received message that was time-stamped by a remote system 700 was, indeed, time-certified. Alternatively, verification means 580 may comprise any biometric device (e.g., iris scan, retina scan, finger scan, hand geometry, voice verification, and dynamic signature verification devices, etc.) may be used in order to further verify the identity of a user of a local PC system 700. Suitable such devices include face recognition devices manufactured and sold by Visionics Corporation, Exchange Place, New Jersey U.S.A., fingerprint readers of the SecureTouch®97 type manufactured by Biometric Access Corporation, Round Rock, Tex. U.S.A., and multiple access devices manufactured by Keyware Technologies.

Finally, the system 700 according to the present invention may simply comprise a stand-alone PC, a server, a PC or workstation coupled to a server, a LAN, WAN, MAN, each of which comprises a plurality of PCs, workstations, and servers. All that is necessary is that the PC or workstation and/or server include fraud prevention means 560 as previously described.

It should, therefore, be understood that within the scope of the claims appended hereto, the present invention may be practiced otherwise than has been specifically described in the foregoing embodiments.

What I claim as my invention is:

1. A system for maintaining trust in content of a digital data file, comprising:

a trusted time source to provide a certifiable time for an unalterable time stamp, wherein said certifiable time confirms at least one of said digital data file's access, creation, modification, receipt, or transmission;

a computing means having installed therein a system clock and an operating systems means for operating said computing means;

an application means running on said operating system means, wherein said application means provides an application programming interface (API) between said trusted time source and said application means, and wherein said application programming interface is adapted to select said trusted time source or said system clock in one or more instances, wherein each of said one or more instances corresponds to a request for a determination of a moment in time;

means for receiving said request to save said digital data file from a user;

means for determining said selection of said trusted time source to provide said determination of said moment in time;

first means for saving said digital data file at said moment in time;

means for retrieving from said trusted time source a date and a time corresponding to said moment in time, wherein said moment in time is substantially a current time of said trusted time source corresponding to receipt of said request;

first means for appending said date and said time retrieved from said trusted time source to said digital data file;

first means for signing said digital data file with said date and said time retrieved from said trusted time source appended thereto;

means for hashing said digital data file to produce a digest;

second means for signing said digest with a key to produce a certificate;

second means for appending said certificate to said digital data file;

second means for saving said digital data file with said certificate appended thereto; and means for verifying trust in the content of said digital data file with said certificate appended thereto.

2. The system of claim 1, wherein said API prevents said system clock from being accessed when said instance is to be determined by said trusted time source.

3. The system of claim 1, wherein said one or more instances includes at least one of an operating system call which is unrelated to said application means, an operating system call which is related to said application means, or an application call which is unrelated to said operating system means.

4. The system of claim 1, wherein said verification means includes a third means for signing said digital data file with said date and said time retrieved from said trusted time source appended thereto with an identifier.

5. The system of claim 4, wherein said identifier corresponds to said computing means used by said user is elected from the group consisting of a platform identifier, a server node identifier, and a network identifier.

6. The system of claim 4, wherein said identifier is selected from the group consisting of an identifier corresponding to said user, an identifier corresponding to a system used by said user, and an identifier corresponding to an enterprise within which said user uses said computing means.

7. The system of claim 4, wherein said user identifier is selected from the group consisting of a plurality of characters identifying said user, first data representing an iris scan of said user, second data representing a retina scan of said user, third data representing a finger scan of said user, fourth data representing said user's hand geometry, fifth data representing said user's voice, sixth data representing said user's signature, and combinations of said plurality of characters, first, second, third, fourth, fifth, and sixth data.

8. The system of claim 1, wherein said trusted time source includes a tamper-evident means.

9. A method for maintaining trust in content of a digital data file with a computing means having installed therein a system clock, an operating systems means for operating the computing means, and an application means running on said operating system means, comprising:

providing, with a trusted time source, a certifiable time for an unalterable time stamp, wherein said certifiable time confirms at least one of said digital data file's access, creation, modification, receipt, or transmission;

providing an application programming interface (API) between said trusted time source and said application means, and wherein said application programming interface is adapted to select said trusted time source or said system clock in one or more instances, wherein each of said one or more instances corresponds to a request for a determination of a moment in time;

receiving said request to save said digital data file from a user;

determining said selection of said trusted time source to provide said determination of said moment in time;

saving said digital data file at said moment in time;

retrieving from said trusted time source a date and a time corresponding to said moment in time, wherein said moment in time is substantially a current time of said trusted time source corresponding to receipt of said request;

appending said date and said time retrieved from said trusted time source to said digital data file;

signing said digital data file with said date and said time retrieved from said trusted time source appended thereto;

hashing said digital data file to produce a digest;

signing said digest with a key to produce a certificate;

appending said certificate to said digital data file;

saving said digital data file with said certificate appended thereto; and verifying trust in the content of said digital data file with said certificate appended thereto.

10. The method of claim 9, wherein said API prevents said system clock from being accessed when said instance is to be determined by said trusted time source.

11. The method of claim 9, wherein said one or more instances includes at least one of an operating system call which is unrelated to said application means, an operating system call which is related to said application means, or an application call which is unrelated to said operating system means.

12. The method of claim 9, wherein said verification means includes a third means for signing said digital data file with said date and said time retrieved from said trusted time source appended thereto with an identifier.

13. The method of claim 12, wherein said identifier corresponds to said computing means used by said user is elected from the group consisting of a platform identifier, a server node identifier, and a network identifier.

14. The method of claim 12, wherein said identifier is selected from the group consisting of an identifier corresponding to said user, an identifier corresponding to a system used by said user, and an identifier corresponding to an enterprise within which said user uses the computing means.

15. The method of claim 12, wherein said user identifier is selected from the group consisting of a plurality of characters identifying said user, first data representing an iris scan of said user, second data representing a retina scan of said user, third data representing a finger scan of said user, fourth data representing said user's hand geometry, fifth data representing said users voice, sixth data representing said user's signature, and combinations of said plurality of characters, first, second, third, fourth, fifth, and sixth data.

16. The method of claim 9, wherein said trusted time source includes a tamper-evident means.

* * * * *